(12) United States Patent
Wang et al.

(10) Patent No.: US 7,991,396 B2
(45) Date of Patent: Aug. 2, 2011

(54) METHOD AND APPARATUS FOR BROADCAST APPLICATION IN A WIRELESS COMMUNICATION SYSTEM

(75) Inventors: Jun Wang, La Jolla, CA (US); Ragulan Sinnarajah, Markham (CA); Sanjeev Arvind Athalye, San Diego, CA (US); Sayed Hossain Beladi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 456 days.

(21) Appl. No.: 10/851,504

(22) Filed: May 21, 2004

(65) Prior Publication Data
US 2005/0075107 A1    Apr. 7, 2005

Related U.S. Application Data

(60) Provisional application No. 60/477,216, filed on Jun. 9, 2003.

(51) Int. Cl.
*H04Q 7/20*    (2006.01)

(52) U.S. Cl. .................. 455/435.1; 455/422.1; 455/560; 370/392; 370/401

(58) Field of Classification Search ............... 455/550.1, 455/435.1, 450, 3.06, 418, 3.01, 3.04, 166.1, 455/164.1–2, 434, 515, 414.1, 560, 422.1; 370/349, 392, 406, 351, 352, 401, 241, 252, 370/328; 725/32, 36, 42, 46, 97, 101
See application file for complete search history.

(56) References Cited

U.S. PATENT DOCUMENTS

| | | | | |
|---|---|---|---|---|
| 5,819,178 A * | 10/1998 | Cropper | .................. | 455/433 |
| 6,021,311 A * | 2/2000 | Gibson et al. | ................ | 340/7.22 |
| 6,191,737 B1 * | 2/2001 | Havinis et al. | ................ | 342/450 |
| 6,253,079 B1 * | 6/2001 | Valentine et al. | ............ | 455/428 |
| 6,445,915 B1 * | 9/2002 | Baiyor et al. | ................ | 455/416 |
| 6,571,136 B1 * | 5/2003 | Staiger | ............ | 700/48 |
| 6,839,829 B1 * | 1/2005 | Daruwalla et al. | ............. | 712/28 |
| 7,035,640 B2 * | 4/2006 | Narayanan et al. | ........... | 455/436 |
| 7,099,655 B2 * | 8/2006 | Song et al. | ................ | 455/411 |

(Continued)

FOREIGN PATENT DOCUMENTS

EP    1363466    11/2003

(Continued)

OTHER PUBLICATIONS

International Search Report—PCT/US04/018470 International Search Authority—European Patent Office—Oct. 28, 2004.

(Continued)

*Primary Examiner* — CongVan Tran
(74) *Attorney, Agent, or Firm* — Howard H. Seo

(57) ABSTRACT

Systems and methods are provided in which an origination station broadcasts a broadcast program to at least one of a plurality of destination stations. A first destination station (or a first group of destination stations) receives a first registration period parameter from the origination station. The first registration period parameter specifies a first period during which the first destination station must register with the origination station. The first destination station may block any attempted registration request that occurs outside the first period. Alternatively, the origination station can deny any attempted registration request by the first destination station that occurs outside the first period. If the registration request from the first destination station is sent before the first period begins, then the destination station can periodically request registration until a request is sent within the first period.

37 Claims, 12 Drawing Sheets

U.S. PATENT DOCUMENTS

| | | | |
|---|---|---|---|
| 7,133,672 B2 * | 11/2006 | Sayeedi | 455/432.1 |
| 7,190,686 B1 * | 3/2007 | Beals | 370/337 |
| 7,218,611 B2 * | 5/2007 | Mimura et al. | 370/241 |
| 7,379,738 B2 * | 5/2008 | Balasubramanian et al. | 455/435.1 |
| 2002/0059628 A1 * | 5/2002 | Mori et al. | 725/97 |
| 2002/0081968 A1 * | 6/2002 | Russell | 455/3.06 |
| 2002/0111134 A1 * | 8/2002 | Salurso et al. | 455/3.06 |
| 2003/0005458 A1 * | 1/2003 | Mori | 725/101 |
| 2003/0046696 A1 * | 3/2003 | Mizuno et al. | 725/46 |
| 2003/0078000 A1 * | 4/2003 | Tatsumi et al. | 455/3.06 |
| 2003/0108059 A1 * | 6/2003 | Yew et al. | 370/443 |
| 2003/0109216 A1 * | 6/2003 | Kim et al. | 455/3.01 |
| 2003/0129980 A1 * | 7/2003 | Sayeedi | 455/435 |
| 2004/0097266 A1 * | 5/2004 | Aerrabotu et al. | 455/558 |
| 2004/0162071 A1 * | 8/2004 | Grilli et al. | 455/435.1 |
| 2004/0163107 A1 * | 8/2004 | Crystal | 725/32 |
| 2004/0192302 A1 * | 9/2004 | Achour et al. | 455/435.1 |
| 2004/0203773 A1 * | 10/2004 | Balasubramanian et al. | 455/435.1 |
| 2004/0235442 A1 * | 11/2004 | Toporski | 455/166.1 |

FOREIGN PATENT DOCUMENTS

| | | |
|---|---|---|
| JP | 2000184338 | 6/2000 |
| JP | 2002353924 | 12/2002 |
| WO | 03017693 | 2/2003 |
| WO | 04075516 | 9/2004 |

OTHER PUBLICATIONS

Written Opinion—PCT/USO4/018470, International Searching Authority—European Patent Office, Oct. 28, 2004.

* cited by examiner

METHOD AND APPARATUS FOR BROADCAST APPLICATION IN A WIRELESS COMMUNICATION SYSTEM

CLAIM OF PRIORITY UNDER 35 U.S.C. §119

The present Application for Patent claims priority to Provisional Application No. 60/477,216 entitled "Method and Apparatus for Broadcast Application in a Wireless Communication System" filed Jun. 9, 2003, and assigned to the assignee hereof and hereby expressly incorporated by reference herein.

BACKGROUND

1. Field

The present invention relates generally to communications, and more specifically to broadcast communications.

2. Background

Wireless communication systems have traditionally been used to carry voice traffic and low data rate non-voice traffic. Today there is an increasing demand for high data rate (HDR) packetized data services that are provided to one or more terminals at the same time. Examples of such high data rate (HDR) services can include multimedia traffic based on voice, audio and video data sources such as, radio broadcasts, television broadcasts, movies, and other types of audio or video content, such as, stock information and emergency information. One example of a HDR service is known as the Broadcast-Multicast Service (BCMCS) for cdma2000® networks. The BCMCS can allow optimization of the cdma2000® radio interface for delivery of BCMCS content stream(s) to one or more terminals in one or more regions of an operator's network. A network operator can control each BCMCS content stream with regard to accounting aspects, regions of the network where the BCMCS content streams are available to various users, and encryption of the content of Multicast IP Flow(s) to protect against unauthorized reception.

As traditional wireless communication systems are designed for voice communications, the extension to support data services introduces many challenges. Specifically, provision of uni-directional services, such as broadcast service where video and audio information is streamed to a subscriber, has a unique set of requirements and goals. Such services typically have large bandwidth requirements. As such, system designers seek to reduce transmission of overhead information. Additionally, specific information is needed to forward and/or access the broadcast transmissions, such as processing parameters and protocols. A problem exists in transmitting the broadcast-specific information while optimizing use of available bandwidth.

Origination stations, such as base stations (BS), can provide multimedia traffic services to destination stations, such as mobile stations (MS), by transmitting an information signal that is often organized into a plurality of packets. A packet includes an address to which the packet is to be delivered, data (or payload) and control elements that are arranged into a specific format. The packet is marked with a beginning and an end. The control elements may comprise, for example, a preamble and a quality metric that can include a cyclical redundancy check (CRC), parity bit(s), and other types of metrics. The packets are usually formatted into a message in accordance with a communication channel structure. The message travels between the origination station and the destination station, and can be affected by characteristics of the communication channel, such as, signal-to-noise ratio, fading, time variance, and other such characteristics. Such characteristics can affect the modulated signal differently in different communication channels.

To begin receiving a BCMCS content stream, each destination station typically attempts to register with an origination station within the network to set up a bearer path for receiving programs. For BCMC services, overhead messages from the origination station tell the destination stations whether a certain program is available and if so whether it is transmitting. This is typically done by having the network provide a start time and an end time to the destination stations (for each program) before the destination stations attempt to register. The destination stations then know whether a certain program is available and if so whether it is transmitting.

Users of many destination stations may attempt to register for the program at approximately the same time by sending a registration message to the origination station over the reverse link access channel (RACH). The RACH is a common channel used for communication of layer 3 and Medium Access Control (MAC) messages from the destination station to the base station. The destination station transmits on the RACH without explicit authorization by the base station. There can be one or more RACHs per frequency assignment, wherein different RACHs are distinguished by different long pseudo-random noise (PN) codes. Typically, each RACH is shared by multiple destination stations. For example, many users may wait and attempt to register for the program shortly before the program starts. If multiple users attempt to register for a program at approximately the same time, then there is a risk that the reverse link access channel (RACH) can become congested, and problems can occur at the origination station.

In a system with many users, the system may not be able to handle the registration of a large number of users at the same time since this may cause congestion in the network at the origination station. Therefore, there is a need for a techniques in a wireless communication system that reduce the likelihood of congestion at the origination station.

SUMMARY

An aspect of the present invention relates to a system that comprises at least one origination station, a plurality of destination stations including a first destination station. The origination station may comprise, for example, a wireless communicator or a mobile station, whereas the destination stations may comprise, for example, base stations.

The origination station broadcasts a broadcast program to at least one of the plurality of destination stations. The origination station can include a registration timer that generates at least one parameter known as an allowed registration period or time. The first destination station receives a first registration period parameter from the origination station. The first registration period parameter specifies a first period during which the first destination station must register (or complete a registration process) with the origination station. In one embodiment, the first destination station blocks any attempted registration request that occurs outside the first period. In another embodiment, the origination station denies any attempted registration request by the first destination station that occurs outside the first period. If the registration request from the first destination station is sent before the first period begins, then the destination station can periodically request registration until a request is sent within the first period. Use of a registration period or registration time can allow the origination station to distribute the times at which different destination stations (or groups of destination stations) are permitted to send registration requests to the origination station.

Another aspect of the present invention relates to a system that comprises at least one origination station, a plurality of destination stations including a first destination station and a second destination station. The origination station broadcasts a broadcast program to at least one of a plurality of destination stations. In one embodiment, the broadcast program may comprises at least one source of content such as an emergency program, an on-going content program, or a scheduled program. In other embodiments, the broadcast program comprises a first source of content and a second source of content.

The origination station can include a registration timer that generates at least one parameter known as an allowed registration period or time. The origination station broadcasts a first acquisition message, associated with the broadcast program, that comprises at least one of a first registration period parameter and a second registration period parameter different than the first registration period parameter. For example, if the broadcast program is a scheduled program, then the first acquisition message comprises a schedule that includes a program start time parameter. In one embodiment, the origination station broadcasts a second broadcast program to at least one of a plurality of destination stations, and a second acquisition message, associated with the second broadcast program, that has at least a third registration period parameter and a fourth registration period parameter.

The first destination station receives the first registration period parameter that specifies a first period during which the first destination station must register with the origination station.

The second destination station receives the second registration period parameter that specifies a second period during which the second destination station must register with the origination station.

In some embodiments, the registration period parameter(s) can comprise an allowed registration period associated with the broadcast program during which the destination station must send a registration attempt message to the origination station. In one embodiment, the allowed registration period associated with the broadcast program indicates an allowed registration period before the start of the broadcast program. The first registration period parameter can be communicated to the first destination station at a first time, and the second registration period parameter can be communicated to the second destination station at a second time. The second time can either be different than the first time or approximately the same as the first time. In addition, if the broadcast program comprises a first source of content and a second source of content, the first registration period parameter can be associated with the first source of content, and a third registration period parameter can be associated with the second source of content that is different than the first registration period parameter. Use of a registration period or registration time can allow the origination station to distribute the times at which different destination stations (or groups of destination stations) are permitted to send registration requests to the origination station.

Yet another aspect of the present invention relates to a system that comprises at least one origination station, a plurality of destination stations including a first group of destination stations and a second group of destination stations. The origination station broadcasts a first acquisition message, associated with the broadcast program, that comprises at least one of a first registration period parameter and a second registration period parameter different than the first registration period parameter. In one embodiment, the origination station broadcasts a second broadcast program to at least one of a plurality of destination stations, and a second acquisition message, associated with the second broadcast program, that has at least a third registration period parameter and a fourth registration period parameter. The first group of destination stations receive the first registration period parameter that specifies a first period during which the first destination stations must register with the origination station. The second group of destination stations receive the second registration period parameter that specifies a second period during which the second group of destination stations must register with the origination station.

DETAILED DESCRIPTION

Figure 1:
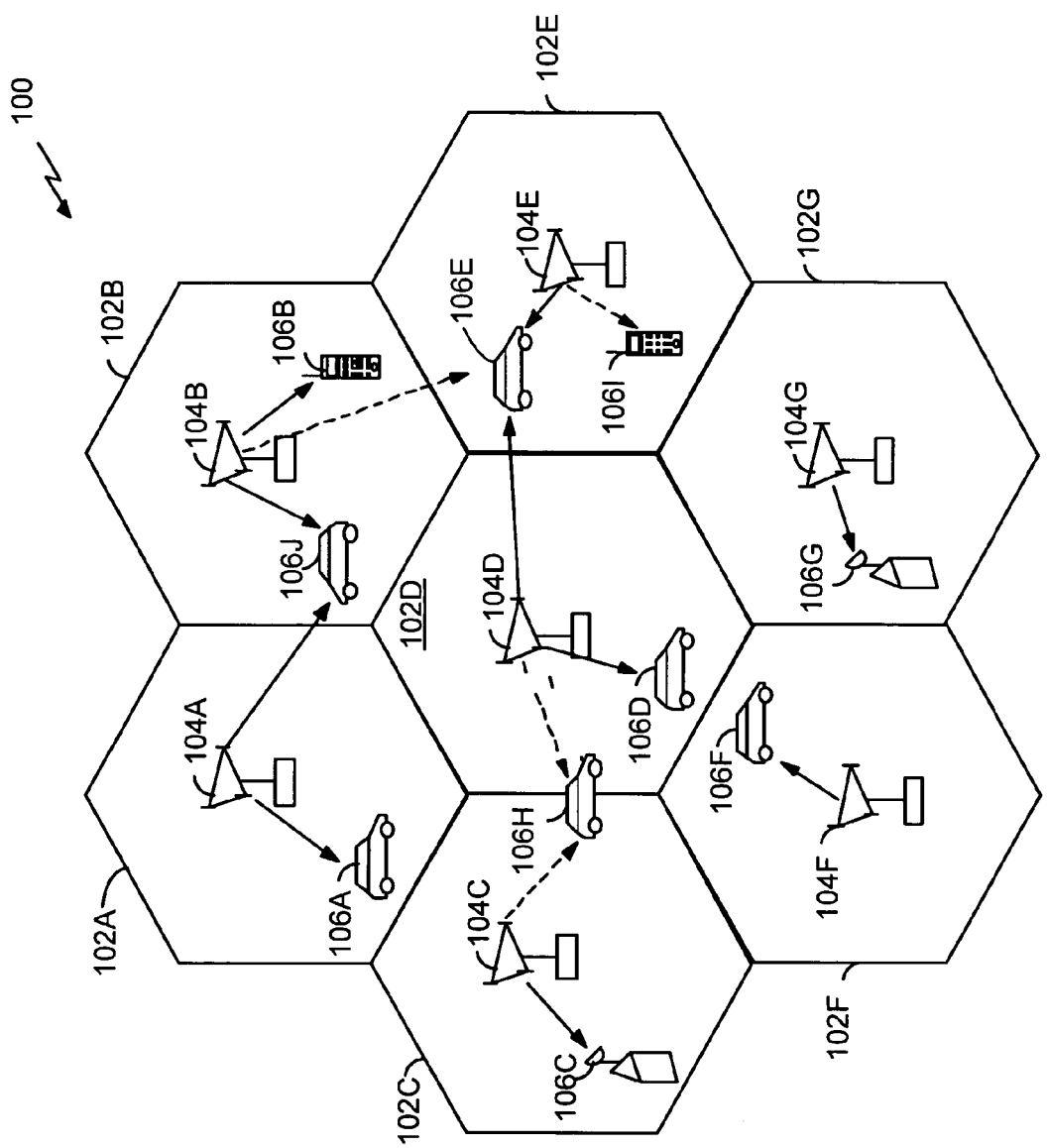
FIG. 1 is an exemplary block diagram of a communications system that supports a number of users.

The word "exemplary" is used herein to mean "serving as an example, instance, or illustration." Any embodiment described herein as "exemplary" is not necessarily to be construed as preferred or advantageous over other embodiments.

The term "destination station" is used herein interchangeably with the terms "mobile station," "subscriber station," "subscriber unit," "terminal" and "User Equipment (UE)," and is used herein to refer to the hardware with which an access network communicates. The term "MS" as used herein can be used to refer to a Mobile Station or a BCMCS application associated with the Mobile Station. The destination station can be a device that allows a user to access network services and may also includes an IMSI or USIM that contains all of a user's subscription information. A mobile station may be mobile or stationary, and can generally include any communicator, data device or terminal that communicates through a wireless channel or through a wired channel, for example, using fiber optic or coaxial cables. Mobile stations may be embodied in devices that include but that are not limited to PC card, compact flash, external or internal modem, or wireless or wireline phone.

The term "origination station" can include, in addition to "base station(s)", all network infrastructure elements such as BSCs, controller, content servers, content providers, routers and serving nodes. The term "origination station" can include the hardware with which mobile station communicates. The term "node B" can be used interchangeably with the term "base station." An origination station may be fixed or mobile.

The term "cell" is used herein to refer to either hardware or a geographic coverage area depending on the context in which the term is used. A sector is a partition of a cell. Because a sector has the attributes of a cell, the teachings described in terms of cells are readily extended to sectors.

The term "connection setup state" refers to the state in which a mobile station is in the process of establishing an active traffic channel connection with a base station.

The term "traffic state" refers to the state in which a mobile station has established an active traffic channel connection with a base station.

The term "dedicated channel" is used herein to refer to a transport channel that is typically dedicated to, or reserved for, a specific user, and that carries information to or from a specific mobile station, subscriber unit, or user equipment. A dedicated channel typically carries all information intended for a given user coming from layers above the physical layer, including data for the actual service as well as higher layer control information. A dedicated channel can be identified by a certain code on a certain frequency. Examples of dedicated channels include a Dedicated Channel (DCH) that carries user data and is specific to a single user, and a Dedicated Transport Channel that typically carries both service data, such as speech frames, and higher layer control information from a mobile station.

The term "common channel" is used herein to refer to a transport channel that carries information to/from multiple mobile stations. In a common channel information may be shared among all mobile stations. A common channel can be divided between all users or a group of users in a cell.

The term "Point-to-Point (PTP) communication" is used herein to mean a communication transmitted over a dedicated communication channel to a single mobile station.

The terms "broadcast communication" or "Point-to-Multipoint (PTM) communication" are used herein to refer to a communication over a common communication channel to a plurality of mobile stations.

The term "physical channel" is used herein to refer to a channel that carries user data or control information over the air interface. Physical channels are the "transmission media" that provide the radio platform through which the information is actually transferred, and serve to carry signaling and user data over the radio link. A physical channel typically comprises the combination of frequency scrambling code and channelization code. In the uplink direction, relative phase is also included. A number of different physical channels are used in the uplink direction based upon what the mobile station is attempting to do.

The term "transport channel" is used herein to refer to a communication route for data transport between peer physical layer entities. Transport channels relate to the manner in which information is transmitted. Generally, there are two types of transport channels known as Common Transport Channels and Dedicated Transport Channels. A transport channel is defined by how and with what characteristics data is transferred over the air interface on the physical layer, for example, whether using dedicated or common physical channels, or multiplexing of logical channels. Transport channels can be used to carry signaling and user data between the Medium Access Control (MAC) layer and the Physical Layer (L1). Information is passed to the physical layer from the MAC layer over any one of a number of transport channels that are mapped to physical channels.

The term "logical channel" is used herein to refer to an information stream dedicated to the transfer of a specific type of information or the radio interface. Logical channels relate to the information being transmitted. A logical channel can be defined by what type of information is transferred, for example, signaling or user data, and can be understood as different tasks the network and terminal should perform at different point in time. Logical channels are mapped into transport channels performing actual information transfer between the mobile station domain and the access domain. Information is passed via logical channels that are mapped through transport channels which are mapped to physical channels.

The term "communication channel or link" is used herein to mean a physical channel or a logical channel in accordance with the context.

The term "reverse link or uplink channel" is used herein to refer to a communication channel/link through which the mobile station sends signals to a base station in the radio access network. This channel may also be used to transmit signals from a mobile station to a mobile base station or from a mobile base station to a base station.

The term "forward link" or "downlink channel" is used herein to mean a communication channel/link through which a radio access network sends signals to a mobile station.

The term "packet" is used herein to mean a group of bits, including data or payload, an address portion, and control elements, arranged into a specific format that is marked with a beginning and an end. The control elements may comprise, for example, a preamble, a quality metric, and others known to one skilled in the art. Quality metric may comprise, for example, a cyclical redundancy check (CRC), a parity bit, and others known to one skilled in the art.

The term "soft handoff" is used herein to mean a communication between a subscriber station and two or more sectors, wherein each sector belongs to a different cell. The reverse link communication is received by both sectors, and the forward link communication is simultaneously carried on the two or more sectors' forward links.

The term "softer handoff" is used herein to mean a communication between a subscriber station and two or more sectors, wherein each sector belongs to the same cell. The reverse link communication is received by both sectors, and the forward link communication is simultaneously carried on one of the two or more sectors' forward links.

The term "erasure" is used herein to mean failure to recognize a message.

The term "allowed registration period" as used herein refers to a time or period of time during which a registration request by a destination station can advance the process of receiving broadcast of the content, such as a program. In one embodiment, the "allowed registration period" is used to refer to a time frame during which a destination station is permitted to attempt registration without the registration attempt being denied or blocked. Attempts to register that do not fall within the "allowed registration period" may, for example, be denied by the origination station or blocked by the destination station. The allowed registration period (RP) indicates a time or a period of time during which a destination station must register with an origination station. The RP can be associated with each broadcast program in a wireless communication system. In this document, the terms "allowed registration time," and "allowed registration period," can be used interchangeably depending on the context. Use of a registration period or registration time can allow the origination station to distribute the times at which different destination stations (or groups of destination stations) are permitted to send registration requests to the origination station.

The term "reverse link access channel (RACH)" as used herein refers to a channel used by the destination station to transmit non-traffic, control information to the origination station. The destination station can use the RACH to communicate with the origination station when the destination station does not have a traffic channel assigned. For example, the destination station can send a registration message to inform the origination station about its location, status, identification and other parameters required to register with the system. Information can be transmitted on the access channel in access channel slots and access channel frames. Two types of messages that can be sent on the RACH include a response message and a request message.

The term "response message" as used herein refers to a message sent in response to a network or BS message.

The term "request message" as used herein refers to a message that is sent autonomously by a destination station such as a MS.

The term "BCMCS content stream" as used herein refers to a single BCMCS broadcast program identified by content name.

The term "Multicast IP Address and Transport Layer Port Number" as used herein refers to a tuple that identifies the destination multicast IP address and the destination transport layer (e.g., UDP) port number for an IP flow within a BCMCS content stream. A "Multicast IP Flow" is similar to an ordinary IP flow except that the destination address is an IP Multicast address. The flow can be identified by source address, source port, destination IP Multicast address, and destination port.

The term "BCMCS_FLOW_ID" as used herein refers to a value used for identification of a BCMCS Multicast IP Flow. The BCMCS_FLOW_ID typically has a variable length, and indicates the length of BCMCS_FLOW_ID as a number of octets. The "BCMCS_FLOW_ID" is an alias for a "Multicast IP Address and Transport Layer Port Number." It is efficiently transported over the air, in contrast to the lengthy format of the "Multicast IP Address and Transport Layer Port Number."

The "content name" represents the name given to the BCMCS content stream by a service provider. The content name can be discovered by a user via SMS, WAP, HTML, etc.

The word "exemplary" is used herein to mean "serving as an example, instance, or illustration." Any embodiment described herein as "exemplary" is not necessarily to be construed as preferred or advantageous over other embodiments.

An exemplary embodiment of a wireless communication system supports a uni-directional broadcast service that provides IP packets to multiple users, for instance, as video and/or audio streams. Subscribers to the broadcast service "tune in" to a designated channel to access the broadcast transmission. As the bandwidth requirement for high speed transmission of video broadcasts is great, it is desirable to reduce the size of any overhead associated with such broadcast transmission.

In "unaddressed" messaging, a broadcast service may be used to send information to a group of users based on their geographic location. Examples include broadcast of local information such as traffic or weather alerts based on a cell/sector or specific paging zone. Authorized users in that area can receive the broadcast information.

In addressable or "multicast" messaging a broadcast service may be used to broadcast information to a specific set of users based on their subscription to a user group. The user group may be maintained by the network operators. In addition, the user group may be publicly subscribable (e.g., sign-up for advertisement, stock quotes, etc.), or it may be closed to public subscription (e.g., corporate list). In closed multicast user groups a member typically subscribes to the service (public multicast group) by sending a request to the administrator, by some web interface, or other mechanism. A private multicast group is restricted to membership explicitly by the administrator manually adding members. A multicast list may also be configured to have the destination station acknowledge receipt of the message.

Broadcast services can also be classified as public groups and private groups. A public broadcast group is used for sending geographic specific information. All devices in the specific geographic area having broadcast capability are in the public group and will receive this information. Examples of public broadcast information include emergency weather alerts, traffic conditions, etc. Private broadcast groups are targeted to sending specific information to a specific group of devices in a particular area. One example of this type of service would be location-based advertising. One possible scenario for this example is where a user may elect to receive specific advertisements when he or she is at a mall, but not at other times.

Note that while the exemplary communication systems are provided as exemplars throughout this discussion, alternate embodiments may incorporate various aspects without departing from the scope of the present invention. For example, the embodiments described herein could also be applied to a data processing system, a wireless communication system, a uni-directional broadcast system, and any other system desiring efficient transmission of information.

Wireless Communication System

The exemplary embodiment described below employs a spread-spectrum wireless communication system, supporting a broadcast service. Wireless communication systems are widely deployed to provide various types of communication such as voice, video, data, and so on. These systems may be based on code division multiple access (CDMA), time division multiple access (TDMA), or some other modulation techniques. A CDMA system provides certain advantages over other types of systems, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited above are hereby expressly incorporated herein by reference.

Each standard specifically defines the processing of data for transmission from base station to mobile, and vice versa. As an exemplary embodiment the following discussion considers a spread-spectrum communication system consistent with the cdma2000 standard of protocols. Alternate embodiments may incorporate another standard. Still other embodiments may apply the methods disclosed herein to other types of data processing systems.

FIG. 1 serves as an example of a communications system 100 that supports a number of users and that can implement at least some aspects of the embodiments discussed herein. Any of a variety of algorithms and methods may be used to schedule transmissions in system 100. System 100 provides communication for a number of cells 102A-102G, each of which is serviced by a corresponding base station 104A-104G, respectively. In the exemplary embodiment, some of the base stations 104 have multiple receive antennas and others have only one receive antenna. Similarly, some of the base stations 104 have multiple transmit antennas, and others have single transmit antennas. There are no restrictions on the combinations of transmit antennas and receive antennas. Therefore, a base station 104 may have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given time. The forward link or downlink refers to transmission from the base station 104 to the terminal 106, and the reverse link or uplink refers to transmission from the terminal 106 to the base station 104. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

Broadcast Multicast System (BCMCS)

According to the exemplary embodiment, the system 100 illustrated in FIG. 1 supports a high-speed multimedia broadcasting service referred to as BCMCS. The broadcast capabilities of the service are intended to provide programming at a data rate sufficient to support video and audio communications. As an example, applications of the BCMC may include video streaming of movies, sports events, etc. The BCMC service is a packet data service based on the Internet Protocol (IP).

Figure 2:
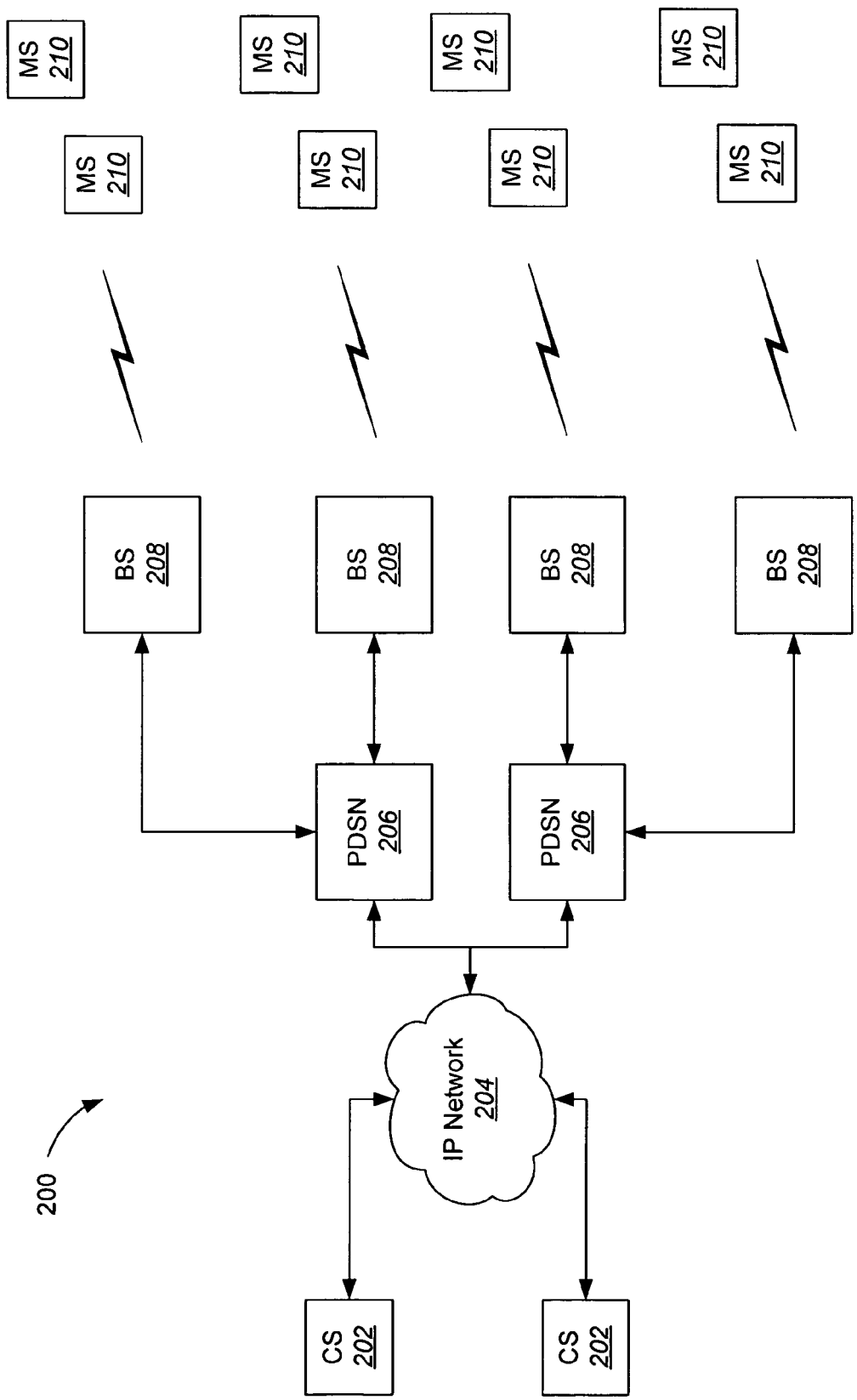
FIG. 2 is an exemplary block diagram of a wireless communication system that includes content servers (CSs), an IP network, PDSNs, base stations (BSs) and mobile stations (MSs).

FIG. 2 is a wireless communication system 200 that includes content servers (CSs) 202, an IP network 204, PDSNs 206, base stations (BSs) 208 and mobile stations (MSs) 210. IP packets are provided by one or more content servers (CSs) 202 via an IP network 204 to one or more Packet Data Serving Nodes (PDSNs) 206. A CS 202 provides data that is transmitted as Internet Protocol data packets ("IP packets") across the IP network 204. Many different kinds of data may be transmitted by the CS 202. For example, audio data, video data, textual data, electronic files may be transmitted by the CS 202 through the IP network 204. Video and audio information may be from televised programming or a radio transmission. Thus, the CS 202 may be a server configured to serve video data, audio data, etc. In one embodiment, the CS 202 may be a web server connected to the Internet and functioning to serve data to users browsing the World Wide Web. The IP network 204 may be, for example, the Internet, an intranet, a private IP network.

The information from a CS 202 can be provided as packetized data, such as in IP packets. The PDSN 206 processes the IP packets for distribution within an Access Network (AN) 300. The AN 300 can be defined as the portions of the system 200 including a BS 208 in communication with multiple Mobile Stations (MSs) 210. The PDSN 206 receives and processes the IP packets to transmit them to one or more Base Stations 208 (BSs). Each PDSN 206 is in electronic communication with one or more BSs 208. Once a BS 208 receives the data, it then sends the data to one or more Mobile Stations 210 (MS). For BCMC service, the BS 208 receives the stream of information from the PDSN 206 and provides the information on a designated channel to subscribers within the system 200. An MS 210 corresponds to a terminal 106 of FIG. 1. Each BS 208 may serve one or more MSs 210. Typically the BS 208 serves many MSs 210.

The BCMC is a stream of information provided over an air interface in a wireless communication system. The "BCMC channel" refers to a single logical BCMC broadcast session as defined by broadcast content. Note that the content of a given BCMC channel may change with time, e.g., 7 am News, 8 am Weather, 9 am Movies, etc. The time based scheduling is analogous to a single TV channel. The "Broadcast channel" (BCH) refers to a single forward link physical channel, i.e., a given Walsh Code that carries broadcast traffic, and may correspond to, for example, a single CDM channel.

A single broadcast channel can carry one or more BCMC channels. If a BCH carries more than on BCMC channel, then the BCMC channels can be multiplexed in a Time-Division Multiplex (TDM) fashion within the single broadcast channel. In one embodiment, a single BCMC channel is provided on more than one broadcast channel within a sector. In another embodiment, a single BCMC channel is provided on different frequencies to serve subscribers in those frequencies.

According to the exemplary embodiment, a service provider is referred to as the CS 202. The CS 202 advertises the availability of such high-speed broadcast service to the system users. Any user desiring to receive the BCMC service may subscribe with the CS 202. The subscriber is then able to scan the broadcast service schedule in a variety of ways that may be provided by the CS 202. For example, the broadcast content may be communicated through advertisements, Short Message System (SMS) messages, Wireless Application Protocol (WAP), and/or some other means generally consistent with and convenient for mobile wireless communications. Base Stations 208 (BSs) can transmit BCMC related parameters in overhead messages, such as those transmitted on channels and/or frequencies designated for control and information, i.e., non-payload messages. Payload refers to the information content of the transmission. In a broadcast session the payload is the broadcast content such as a video program. When a broadcast service subscriber desires to receive a broadcast session, such as a particular broadcast scheduled program, the MS 210 reads the overhead messages and learns the appropriate configurations. The MS 210 then tunes to the frequency containing the BCMC channel, and receives the broadcast service content.

In order for the MSs 210 to discover and listen to broadcast channels successfully, various broadcast service related parameters can be transmitted over the air interface. The broadcast service is designed to support different protocol options in a protocol stack. As such, the receivers of the broadcast service should be informed of the protocol options selected to facilitate proper decoding and processing of the broadcast. In one embodiment, the CS 202 provides this information to the receiver as an overhead system parameter message, consistent with cdma2000 standard. The advantage to the receiver is the ability to receive the information immediately from the overhead message. In this way, the receiver may immediately determine whether the receiver has sufficient resources to receive the broadcast session. The receiver monitors the overhead system parameter messages. The system may implement a service option number corresponding to a set of parameters and protocols. The service option number can be provided in the overhead message. Alternately, the system may provide a set of bits or flags to indicate the different protocol options selected. The receiver can then determine the protocol options for decoding the broadcast session correctly.

Overview of the BCMCS architecture

Figure 3:
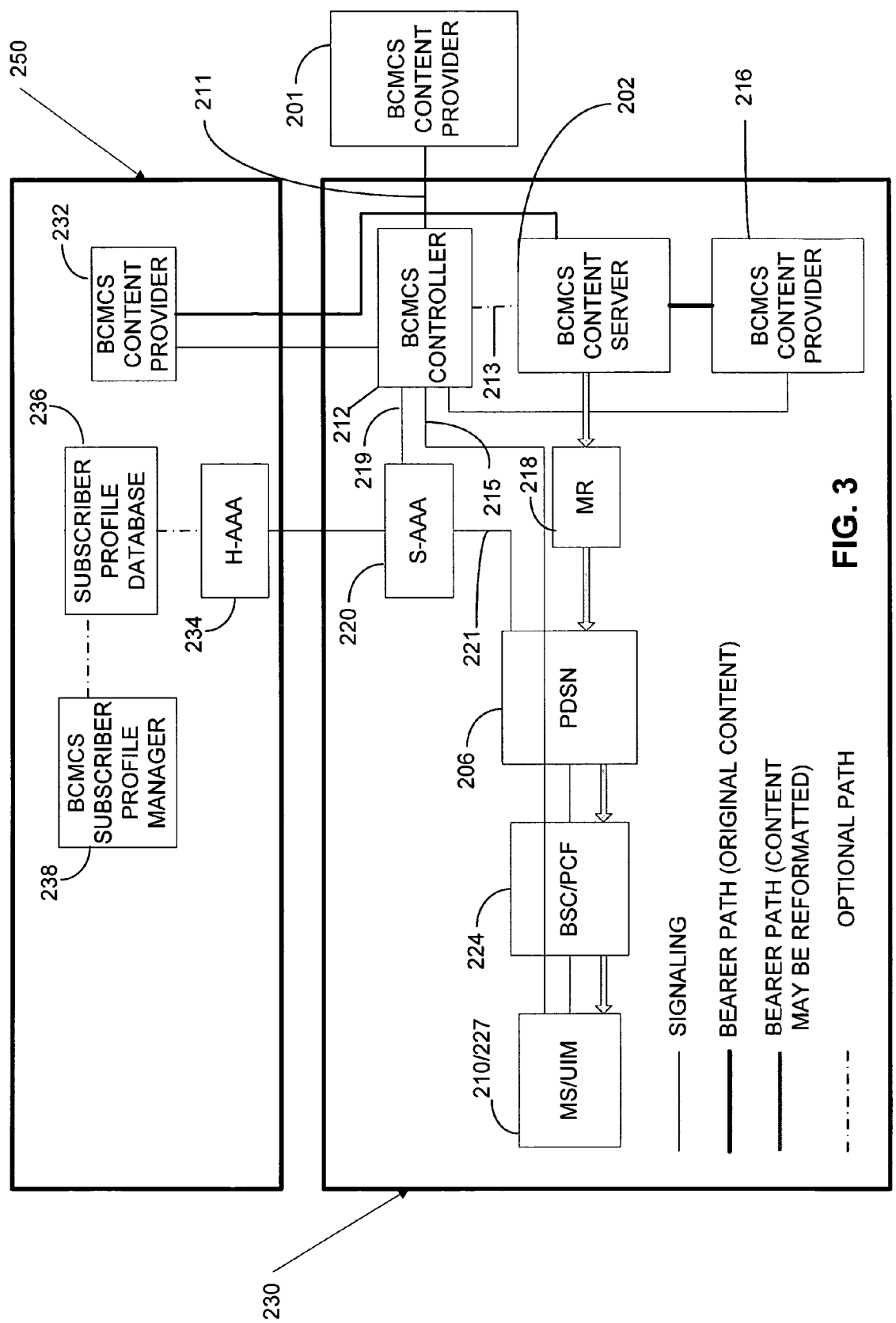
FIG. 3 is an exemplary block diagram block diagram of the communication system supporting broadcast transmissions.

FIG. 3 is a block diagram of the communication system supporting broadcast transmissions. The BCMCS architecture shown includes a BCMCS content provider 201, a serving network 230 and a home network 250.

The serving network 230 includes a BCMCS controller 212, a BCMCS content server (BCMCS-CS) 202, a BCMCS content provider 216, a multicast router (MR) 218, a Serving Authentication, Authorization, and Accounting entity (SAAA) 220, a Packet Data Serving Node (PDSN) 206, a Base Station Controller/Packet Control Function (BSC/PCF) unit 224 and a mobile station (MS) 210 with a User Identity Module (UIM) 210. Within the BCMCS architecture various interfaces are provided between these subsystems as will be described below.

The BCMCS content provider 201 is a source of BCMCS content. The BCMCS content provider (BCMCS-CP) may be located within the cdma2000® serving network 230 or home network 250 or anywhere in an IP network (such as the Internet). If the BCMCS content provider 201 is located in the IP network, the business association, security association, and other related service information can be provisioned between the cdma2000® carrier network and the content provider 201. The BCMCS content provider (BCMCS-CP) 201 sends BCMCS content over a bearer path to the BCMCS content server (BCMCS-CS) 202, and makes BCMCS content available within an IP Multicast stream. An interface 211 may be provided, between the BCMCS Controller 212 and the BCMCS content provider 201, that exchanges information including content provider name, content name, session description (e.g., codec type), and security information. This interface may also exchange the start time of the BCMCS session and duration of the BCMCS session.

The BCMCS content server 202 can be connected to the cdma2000® access network through a Packet Data Serving Node (PDSN) 206 that handles the BCMCS content stream. The BCMCS content server 202 is not necessarily the creator or source of the content, but is the last application level entity to manipulate (e.g., reformat) the content prior to the content reaching the PDSN 206. The BCMCS content server 202 may store and forward the content from the content provider 216 over a bearer path, or it can merge the content from the multiple content providers. If higher layer encryption is enabled, the BCMCS content server 202 may encrypt the stream content.

The BCMCS content server 202 can provide reformatted content to the multicast router (MR) 218. The multicast router (MR) 218 is an optional entity and is defined by various IETF RFCs. If the BCMCS content server 202 sends the content directly to the PDSN 206, then the MR can be omitted.

An interface 213 between the BCMCS Controller 212 and BCMCS content server 202 may exchange the security information, multicast IP Address and port number, and content management information (e.g., the start time of the BCMCS session and duration of the BCMCS session).

The BCMCS Controller 212 manages and provides the BCMCS session information to the PDSN 206, the MS 210, and the content server 202. The BCMCS Controller 212 also performs authorization using the BCMCS user profile received from the Home Authentication, Authorization and Accounting (HAAA) entity 234. The BCMCS Controller 212 may also serve the function of BAK Distributor and BAK Generator. The BCMCS Controller 212 can also perform discovery operations to find desired content. The BCMCS Controller 212 may also authenticate the BCMCS content provider 216, and coordinate the delivery of BCMCS content to the BCMCS content server 202.

The SAAA 220 performs BCMCS authentications, authorizations, and accounting. The SAAA 220 may send the user subscription profile, received from the H-AAA 234, to the BCMCS Controller 212.

An interface 219 between the BCMCS Controller 212 and S-AAA 220 provides the BCMCS controller 212 with authentication and authorization information. The S-AAA 220 may send BCMCS user profile received from the H-AAA 234 to the BCMCS Controller 212 during BCMCS information acquisition by the MS 210. The BCMCS Controller 212 may send accounting information to the S-AAA 20. The S-AAA 220 may also be used to relay the BCMCS session related information between the PDSN 206 and BCMCS Controller 212.

An interface 221 between the SAAA 220 and PDSN 206 provides BCMCS session related information such as Flow Treatment (e.g., Header Compression), and performs mapping between the BCMCS_FLOW_ID and Multicast IP address and port number from the BCMCS Controller 212 to the PDSN 206. This interface 221 also exchanges the BCMCS authorization information for bearer path setup of BCMCS.

The PDSN 206 receives content from the BCMCS CS 202 (and the MR 218 if included) that may have been reformatted by the BCMCS CS 202. The PDSN 206 electronically communicates with the BSC/PCF 224 to add and remove Multicast IP Flows. The PDSN 206 may use IP multicast protocols to manage bearers supporting Multicast IP Flow between itself and the nearest router connecting back to the BCMCS content server 202. The PDSN 206 also applies the flow treatment received from the BCMCS Controller 212 to the Multicast IP Flows. The PDSN 206 chosen by the PCF 208 to supply Multicast IP Flows may be different from the PDSN 206 supporting normal PPP connections to the MS 210.

The BSC/PCF 224 entities receive output of the PDSN 206, and are responsible for signaling, establishing, and tearing down bearer channels between the PDSN 206 and the MS 210. If the link layer encryption is enabled, the BSC 224 also serves the function of SK Generator. The BSC chooses the "best" bearer channel to the MS 210 based on considerations such as optimization of resources, QoS requested, etc.

An interface 215 between the BCMCS Controller 212 and MS/UIM 210, 227 provides the BCMCS client application in the MS 210 with access to information such as available BCMCS sessions including content provider name, content name, BCMCS_FLOW_ID(s), BAK(s) and BAK Expiry time (if the Multicast IP Flow(s) are encrypted), start time of the BCMCS session, duration of the BCMCS session, flow treatment (e.g., header compression), and session description (e.g., codec type), etc.

The home network 250 includes a BCMCS content provider 232, a Home Authentication, Authorization, and Accounting (HAAA) entity 234, a Subscriber Profile Database (SPD) 236 that stores the BCMCS subscription profile, and a subscriber Profile Manager (SPM) 238. The subscription profile Stored in the Subscriber Profile Database 236 identifies the BCMCS sessions that the user may receive, and a Registration Key. The HAAA 234 accesses the Subscriber Profile Database 236 to obtain information from the subscription profile.

The BCMCS Subscriber Profile Manager 238 is an application that updates the subscriber profile in the databases regarding subscribed BCMCS services. The user may interface to this application directly, or the operator may reserve access to this application to their customer service agents. Interfaces may be provided between the user and the BCMCS Subscriber Profile Manager 238, and between the BCMCS Subscriber Profile Manager 238 and the Subscriber Profile Database 236.

Figure 4:
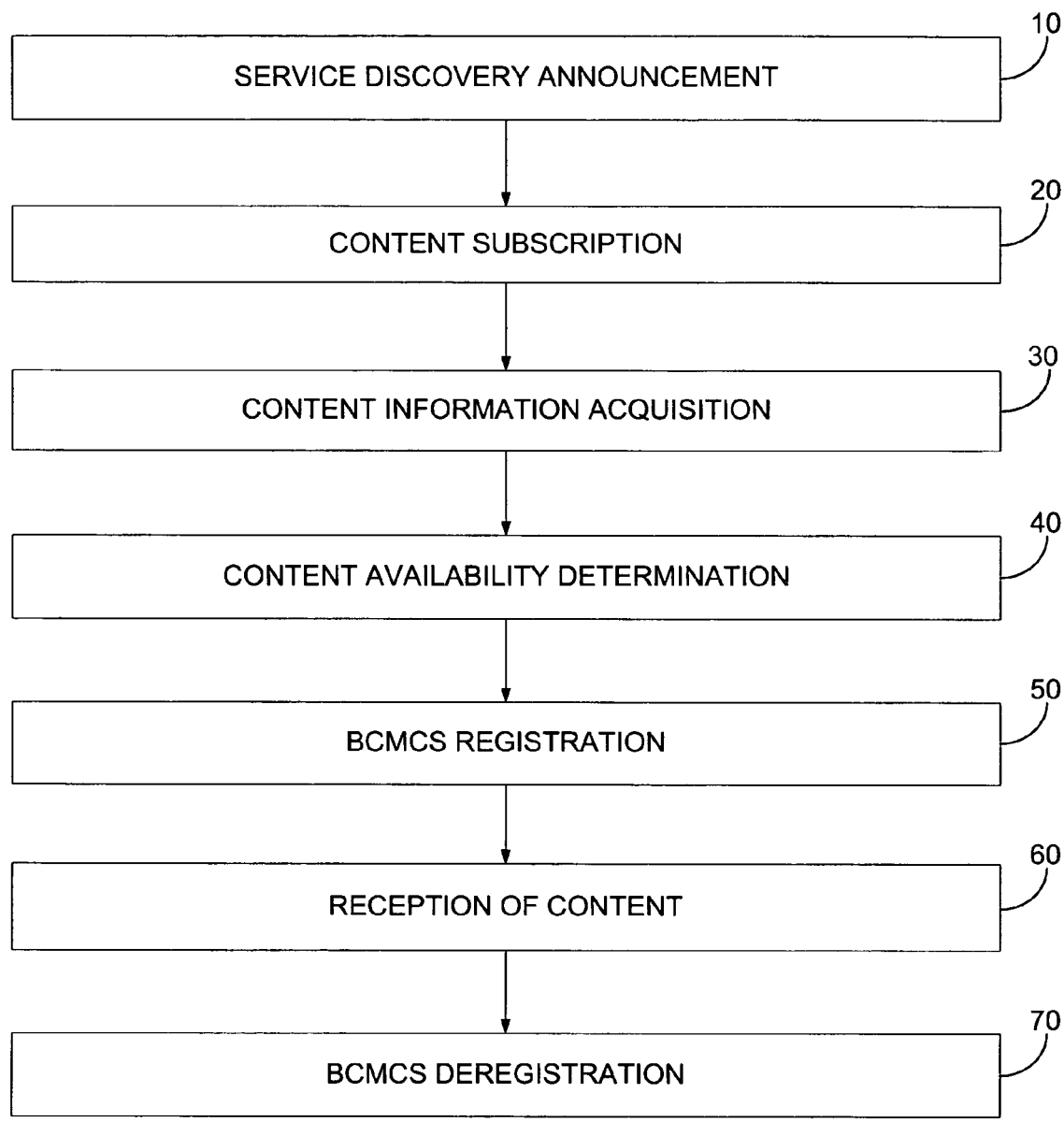
FIG. 4 is an exemplary block diagram that shows various processes that can enable reception of a BCMC service by a destination station.

Reception of a BCMCS by a MS can be enabled by a number of procedures. FIG. 4 is an exemplary block diagram that shows various processes that can enable reception of a BCMC service by MS 210.

Service Discovery, Information Acquisition, and Content Availability Determination At block 10, the user can discover the BCMCS service provided by the serving network in a variety of ways. At block 20, if the user desires the particular service, the user may subscribe to one or more BCMCS content types. At block 30, the MS can acquire content information by first communicating with a BCMCS Controller to acquire session related information such as BCMCS related information and encrypted services information. BCMCS related information may include, for example, an association of BCMCS_FLOW_ID and (Multicast IP address, Port), Flow Treatment (e.g., Header Compression, or Header Removal), and the Transport and Application Protocols. According to aspects of the invention described below, the BCMCS related information can include an allowed registration time or allowed registration period. Encrypted services information can include, for example, BAK_ID, BAK and BAK Expiry time. Information acquisition from the BCMCS controller will now be described in greater detail below.

Figure 5:
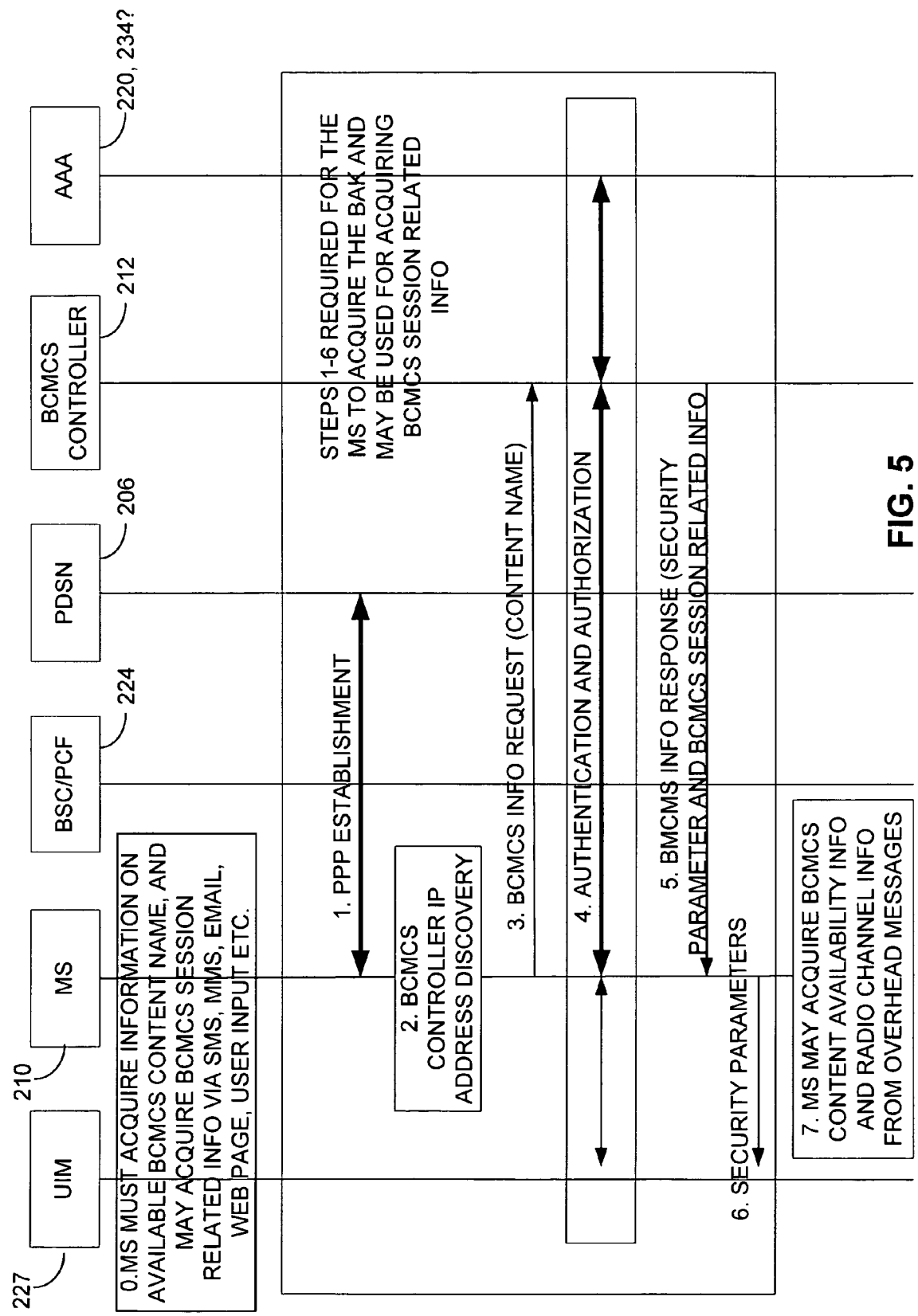
FIG. 5 is a message flow diagram that illustrates the flow of messages during the BCMCS service discovery, information acquisition, and content availability determination.

FIG. 5 is a message flow diagram that illustrates the flow of messages during the BCMCS Service Discovery, Information Acquisition, and Content Availability Determination. In FIG. 5, if the MS must acquire the BCMCS keys (BAKs) or some session related information for a given BCMCS content, then steps 1 through 6 are followed. The procedures specified in steps 1-6 of FIG. 5 can be performed when the MS is directed by the user to request BCMCS session related information after BCMCS subscription, the BAK is expired, or the MS 210 is directed by the network to update the BCMCS session related information. Outside of the scope of BCMCS messaging, anytime before step 3 of FIG. 5, the MS 210 must acquire BCMCS content name and may acquire other information such as BCMCS schedules, BCMCS_FLOW_ID(s), and BAK(s) etc., as shown at step 0 of FIG. 5. Such information may be acquired by SMS, MMS, email, web page browsing, provisioning by the network operator, user input, email, etc.

At step 1 of FIG. 5, if the PPP has not been established, the MS 210 originates a data call to set up PPP with the PDSN 206. At step 2 of FIG. 5, if the MS 210 does not know the IP address of the BCMCS Controller 212, the MS 210 discovers the IP address of BCMCS Controller 212. At step 3 of FIG. 5, the MS 210 sends BCMCS Information Request that includes the content name to the BCMCS Controller 212 to request the BAK and/or BCMCS session related information. At step 4 of FIG. 5, authentication procedures may be performed. Upon successful authentication and authorization, the AAA 220 sends TK and TK_RAND to the BCMCS Controller 212. At step 5 of FIG. 5, the BCMCS Controller 212 sends BCMCS Information Response to the MS 210 including the security parameters (such as TK_RAND, BAK_ID, BAK Expiry time, and BAK encrypted with TK) and some other BCMCS session related information (such as flow treatment (e.g., header compression), application/transport protocol, and association between BCMCS_FLOW_ID and multicast IP address and port number etc). At step 6 of FIG. 5, the MS 210 forwards the security parameters, such as TK_RAND, BAK_ID, BAK Expiry time, and BAK encrypted with TK, to the UIM 227 together with BCMCS_FLOW_ID associated with it. The UIM 227 computes TK using RK and TK_RAND, and decrypts the encrypted BAK via the computed TK.

Step 7 of FIG. 5 provides a possible means for the MS 210 to obtain the content availability and radio channel information for a given Multicast IP Flow identified by a BCMCS_FLOW_ID that the MS 210 knows. This BCMCS_FLOW_ID will have been acquired earlier.

If the MS 210 cannot obtain the content availability and radio channel information for a given BCMCS_FLOW_ID, it may use a BCMCS Registration Request mechanism to determine the availability and radio configuration information of that Multicast IP Flow. The MS may not be able to obtain the information from the overhead channel under certain conditions. For example, the RAN may not be transmitting BCMCS information in the overhead channel, or the room in the overhead channel may not be sufficient for the particular information the mobile 210 is seeking. The MS 210 can also perform (re-)registrations, notifying the BS 208 of the BCMCS_FLOW_ID(s) that the MS 210 continues to monitor.

Once the MS acquires content information, at block 40 of FIG. 4, the MS determines whether the content associated with a particular Multicast IP flow is available. The MS can also determine BCMCS radio configuration information from a BS via overhead messages, if the BS broadcasts this information on overhead messages. If the MS cannot find the information from the overhead messages and if the BSC indicates on the overhead messages that BCMCS Registration is permitted, the MS may request the desired IP flow(s) via the BCMCS Registration Request technique at block 50. If the desired IP flow(s) are not to be made available to the MS for any reason, the network may indicate that to the MS.

Registration allows the MS to inform the network or BS, for example, where the MS is and on what channel(s) the MS can be paged. This allows the BS to page the MS whenever a call is to be delivered to the MS. The registration message can be used to notify the BS of its identification, location, status, slot cycle, and other characteristics. The MS receives messages from the BS on a paging channel. Once the MS 210 registers at block 50 of FIG. 4, a bearer path set up procedure is initiated. As described below, this procedure varies depending on whether the broadcast is a static or dynamic broadcast service.

Bearer Path Set Up Procedure for Static Broadcast Services

A "static broadcast" refers to a broadcast service in which the bearer path is statically provisioned by the operator (e.g., via Operations, Administration, and Maintenance (OAM)) regardless of the user presence in the cell/sector. For static broadcast services, BCMCS bearer paths (A8 and A10 connection) may be established or set up at any time.

Bearer Path Set Up Procedure for Dynamic Broadcast Services

A "dynamic broadcast" refers to a broadcast service where the bearer path can be established dynamically based on the user presence in the cell/sector. For dynamic broadcast services, the BCMCS bearer path setup procedure is triggered by the first user's BCMCS registration during which the MS 210 requests delivery of one or more multicast IP flows identified by the BCMCS_FLOW_ID.

Upon a BCMCS registration request by the MS of the first authorized user, the network can set up a bearer path by triggering the PDSN 206 to join the multicast group associated with the BCMCS_FLOW_ID(s). Upon the bearer path being established, if header compression is enabled by the PDSN 206, the PDSN 206 periodically sends the header context on the same bearer path.

Bearer path establishment from the BSC 208 to Packet Control Function (PCF) (A8) 208 and from the PCF 208 to PDSN (A10) 206 can be accomplished using IOS signaling messages. Bearer path establishment from the PDSN 206 to the Multicast Router (MR) 218 can be accomplished using appropriate Internet Engineering Task Force (IETF) multicast protocols. The A8 and A10 connections used to transport Multicast IP Flows are separate and independent from the A8 and A10 connections used to support for a non-BCMCS service instance to the MS 210.

The MS 210 starts monitoring the radio channel carrying the desired BCMCS content. Normally multiple MSs 210 can monitor the same shared BCMCS radio channel. The BS 208 may allocate a shared channel or a dedicated channel for BCMC depending on system conditions. For example, the BS 208 may allocate dedicated channels when appropriate to preserve power since using dedicated channels could potentially reduce total power used but could end up using more Walsh codes. At block 60 of FIG. 4, the MS 210 receives content.

Bearer Path Release

To save system resources, bearer paths over the air (radio channels), RAN bearer paths (A8 and A10), and core network bearer paths (between PDSNs 206 and MRs 218) may all be released when no longer needed.

An initial step of releasing the bearer path is BCMCS deregistration. Deregistration may be triggered, for example, by the MS 210 notifying the BS 208 that the MS 210 is no longer monitoring the Multicast IP Flow(s) identified by the BCMCS_FLOW_ID(s). The BSC 208 can use such explicit BCMCS de-registrations for particular Multicast IP Flow(s) to detect that no more MSs 210 monitoring Multicast IP Flow(s). Deregistration may also be triggered by the system determining that there are no more MSs listening to a particular Multicast IP Flow identified by a particular BCMCS_FLOW_ID(s). For instance, if the lifetime of the BCMCS registration expires, the BSC 208 can detect that no MSs 210 are monitoring particular Multicast IP Flow(s) (identified by particular BCMCS_FLOW_ID(s)) through the absence of periodic BCMCS re-registrations for those particular Multicast IP Flow(s). In this case, a BCMCS deregistration may occur via timeout at the BS 24. Once deregistration takes place, to save system resources, the system may release the bearer path associated with the corresponding Multicast IP Flow.

At block 70 of FIG. 4, the MS 210 may perform BCMCS deregistration, and release the bearer paths. The network may release the BCMCS bearer path, for example, if the BCMCS program is complete. In some cases, the operator may notify the MS 210 whether BCMCS deregistration is required.

Once the bearer path is released, the network can indicate to the MSs 210 that corresponding BCMCS content stream, identified by the BCMCS_FLOW_ID(s), has stopped transmitting, and that registration for the content is not allowed.

Allowed Registration Period

As noted above, each mobile station (MS) typically attempts to register with a base station in order to set up a bearer path for receiving programs. For BCMC services, overhead messages from the BS tells mobile station whether a certain program is available and if so whether it is transmitting. This could be done, for example, by having the network provide a start time and an end time to the mobile station (for each program) before the MS attempts to register. The MS then knows whether a certain program is available and if so whether it is transmitting.

However, many users may attempt to register for the program at approximately the same time by sending a registration message to the BS using over the reverse link access channel (RACH) that is assigned to that MS. For example, many users may wait and attempt to register for the program shortly before the program starts. If multiple users attempt to register for a program at approximately the same time, then there is a risk that the reverse link access channel (RACH) can become congested, and problems can occur at the BS.

Figure 6:
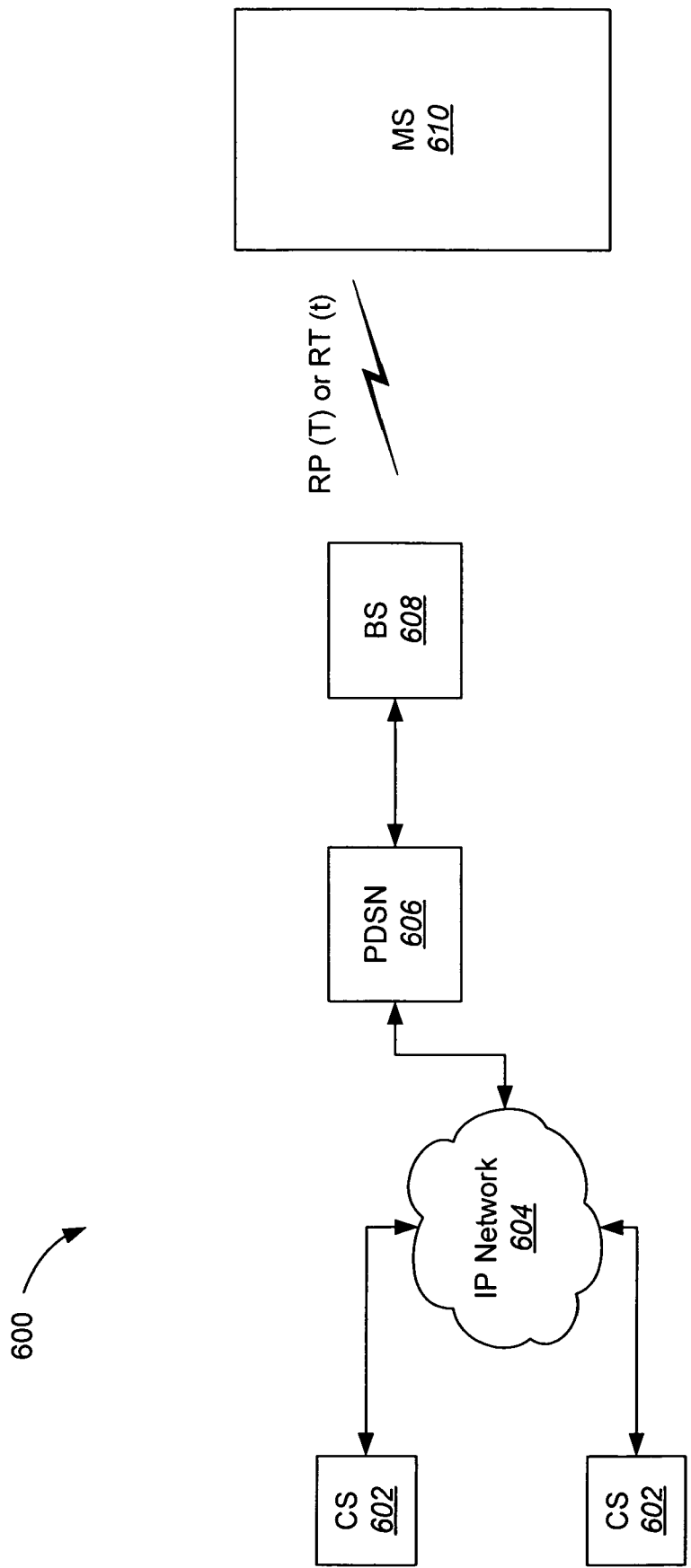
FIG. 6 is an exemplary block diagram of a communication system in which an allowed registration period (RP) or allowed registration time (RT) can be provided to a destination station for each program.

FIG. 6 is a diagram of a communication system 600 in which an allowed registration period (RP) or allowed registration time (RT) can be provided to a mobile station 610 for each program. The allowed RT/RP indicates a time or period of time during which a registration request by a destination station will be accepted by the origination station such that the destination station will be allowed to register for a given program. The RP can be associated with each broadcast program that is broadcast in the wireless communication system. For example, an allowed RP associated with a movie may indicate a registration period before start of the broadcast time, during which the destination station 610 is permitted (by either the destination station or the origination station) to send a registration request to the origination station such that the origination station will grant the request and eventually start sending broadcast content. A program may comprise multiple contents, and each content of such a program may have an associated allowed RT/RP for registration. In other words, an allowed RT/RP may be associated with broadcast of an entire program or broadcast of each content of each program.

Figure 7A:
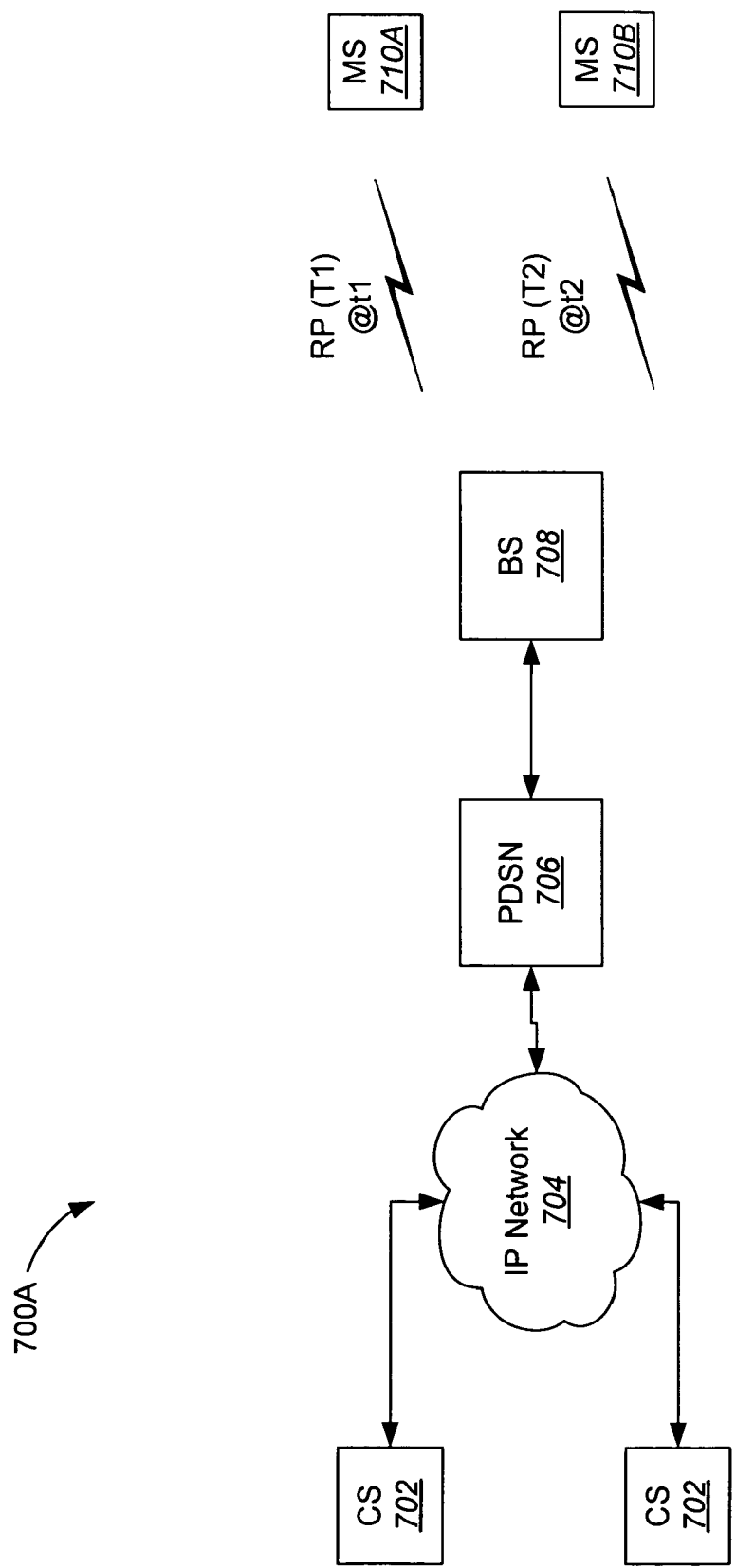
FIG. 7A is an exemplary block diagram of a communication system that supports a number of destination stations in which different allowed registration periods (RPs) or allowed registration times (RTs) can be provided to each destination station for each program.

FIG. 7A is a diagram of a communication system 700A that supports a number of users. The communication system comprises an origination station 708, and destination stations 710 including a first destination station 710A and a second destination station 710B. The station 710 may comprise, for example, a wireless communicator or a mobile station, whereas the stations 708 may comprise, for example, base stations. The station 708 broadcasts a broadcast program to at least one of the plurality of destination stations 710.

The broadcast program is received by at least one of a plurality of destination stations 710. For example, a mobile station or a group of mobile stations 710A,B may receive broadcast information from a base station or other sources. In one embodiment, the broadcast program may comprise at least one source of content such as an emergency program, an on-going content program, or a scheduled program. Additionally, a single program may have a number of different contents. For example, the broadcast program may include a first source of content (e.g., a main feature such as a movie) and a second source of content (e.g., a news highlights appearing in the bottom of the screen at the same time). Prior to sending the broadcast program, the origination station 708 can broadcast a first message, associated with the broadcast program, that comprises at least one of a first registration period parameter RP1 and a second registration period parameter RP2 different than the first registration period parameter RP1. For example, if the broadcast program is a scheduled program, then the first message may include a schedule that includes a program start time parameter.

The first destination station 710A receives a first registration period parameter RP1 from the origination station 708. The first registration period parameter specifies a first period T1 during which the first destination station 710A is allowed to register with the origination station 708 or a first time at which the first destination station 710A is permitted to register for the program.

In some embodiments, the registration period parameter(s) can comprise an allowed registration period associated with the broadcast program during which the destination station 710 is allowed send a registration attempt message to the origination station 708. In one embodiment, the allowed registration period associated with the broadcast program indicates an allowed registration period before the start of the broadcast program.

In one embodiment, the first destination station 710A blocks any attempted registration request that occurs outside the first period T1. A user's request to register with a program can be blocked by the MS 710A if user attempts to register before the allowed registration period. This enables the MS 710A to block any registration request by the user if such request falls outside the allowed registration period T1 which can conserve over the air resources.

In another embodiment, the origination station 708 denies any attempted registration request by the first destination station 710A that occurs outside the first period T1. If the registration request from the first destination station 710A is sent before the first period T1 begins, then the destination station 710A can periodically request registration until a request is sent within the first period T1 or exceeds a given number of requests.

When a second destination station 710B is included, the second destination station 710B receives the second registration period parameter RP2 that specifies a second period T2 during which the second destination station 710B must register with the origination station 708. The RT/RP for each program for each destination station (or group of destination stations) may be different. For instance, one group of mobile stations 710A may have one allowed RT/RP (t1 or T1) associated with a broadcast of a program, and another group of mobile stations 710B may have a different allowed RT/RP (t2 or T2) associated with the same broadcast of the same program. During an emergency broadcast, for example, in which a large number of mobile stations may receive the same message via short message services, one group of mobile stations may receive one allowed RT/RP (t1 or T1) and another group may receive a different RT/RP (t2 or T2) for the same emergency broadcast. As such, congestion due to registration by a large number of mobile stations for the same program may be reduced and/or prevented.

The allowed RT/RP may be communicated to the mobile stations at the same time or different times. For example, the first registration period parameter can be communicated to the first destination station 710 at a first time t1, and the second registration period parameter can be communicated to the second destination station 710 at a second time t2. The second time t2 can either be different than the first time t1 or approximately the same as the first time t1. In addition, if the broadcast program comprises a first source of content and a second source of content, the first registration period parameter RP1 can be associated with the first source of content, and another registration period parameter can be associated with the second source of content that is different than the first registration period parameter RP1.

Figure 7B:
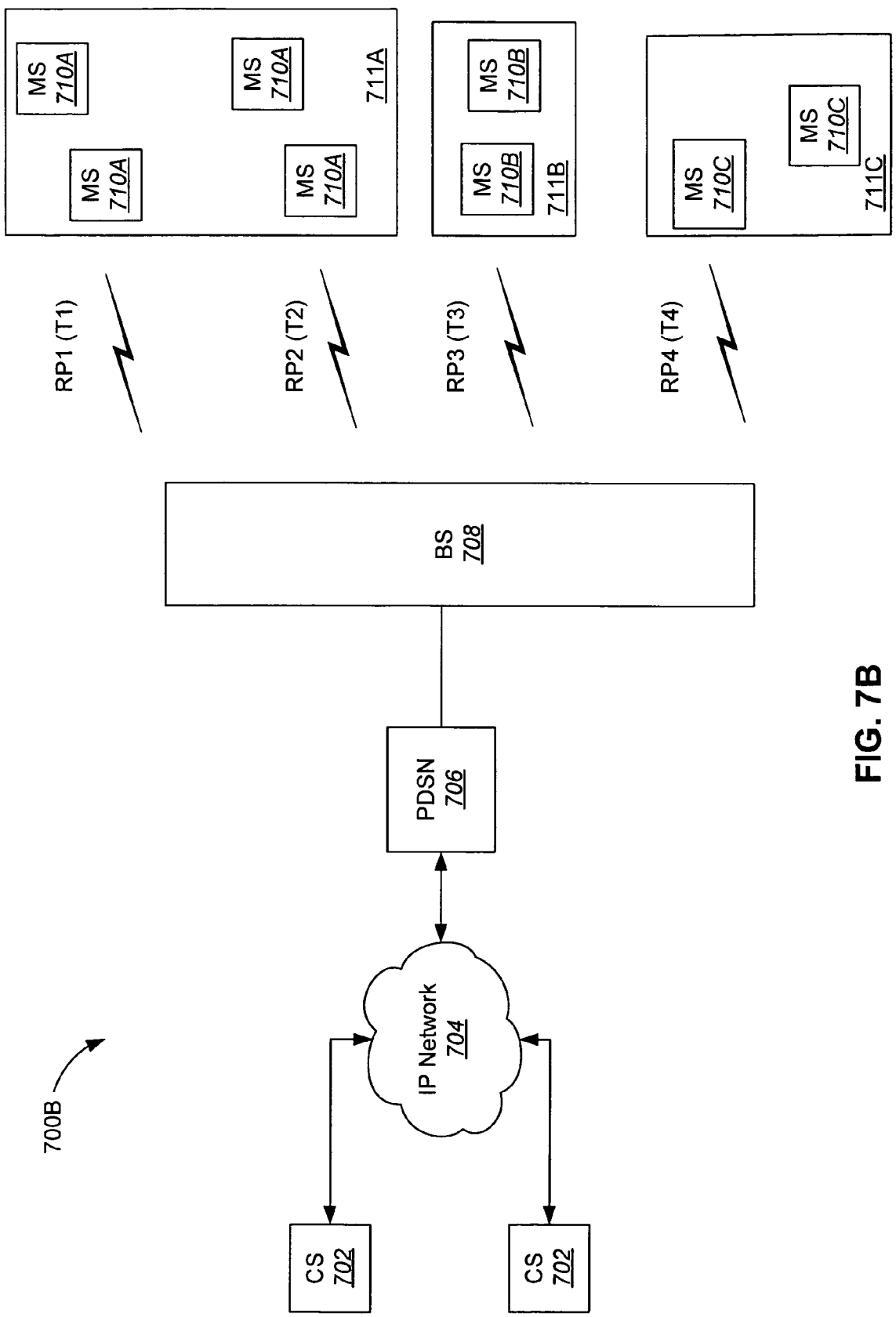
FIG. 7B is an exemplary block diagram of communication system that comprises an origination station, a first group of destination stations, a second group of destination stations, and a third group of destination stations in which different allowed registration periods (RPs) or allowed registration times (RTs) can be provided to each group of destination stations for each program.

The allowed registration times or periods for different mobiles or different groups of mobile can be distributed such that those times or periods are different to thereby reduce the likelihood of congestion on the reverse link access channel (RACH). FIG. 7B is a communication system 700B that comprises at least one origination station 708, and destination stations 710 including a first group of destination stations 711A, a second group of destination stations 711B, and a third group of destination stations 711C. The origination station 708 broadcasts a first acquisition message, associated with the broadcast program, that comprises a first registration period parameter RP1 and a second registration period parameter RP2 different than the first registration period parameter RP1. Selected ones of the first group of destination stations 711A receive the first registration period parameter RP1 that specifies a first period T1 during which the selected ones of the first group of destination stations 711A must register with the origination station 708, and selected others of the first group of destination stations 711A receive the second registration period parameter RP2 that specifies a second period T2 during which the selected others of the first group of destination stations 711A must register with the origination station 708.

The origination station 708 may also broadcast a third registration period parameter RP3 and a fourth registration period parameter RP4 to the second group of destination stations 711B, and a third group of destination stations 711C, respectively.

The second group of destination stations 711B receive the third registration period parameter RP3 that specifies a third period T3 during which the second group of destination stations 711B must register with the origination station 708. The fourth group of destination stations 711C receive the fourth registration period parameter RP4 that specifies a fourth period T4 during which the third group of destination stations 711C must register with the origination station 708.

In other embodiments, it is desirable if the allowed registration times are distributed to reduce the likelihood of congestion on the RACH. As such, different registration times may be assigned to each destination station (or group of destination stations) that correspond to a specific time or a specific set of times at which each destination station (or group of destination stations) can request registration. For example, a first set of registration times $t_1, t_4, t_7, \ldots$ may be assigned to a first destination station (or group of destination stations), a second set of registration times $t_2, t_5, t_8, \ldots$ may be assigned to a second destination station (or group of destination stations), a third set of registration times $t_3, t_6, t_9, \ldots$ may be assigned to a third destination station (or group of destination stations), etc.

The concepts mentioned herein can be extended to situations in which multiple programs are being transmitted from an origination station having a number of RTs/RPs associated therewith.

Figure 8:
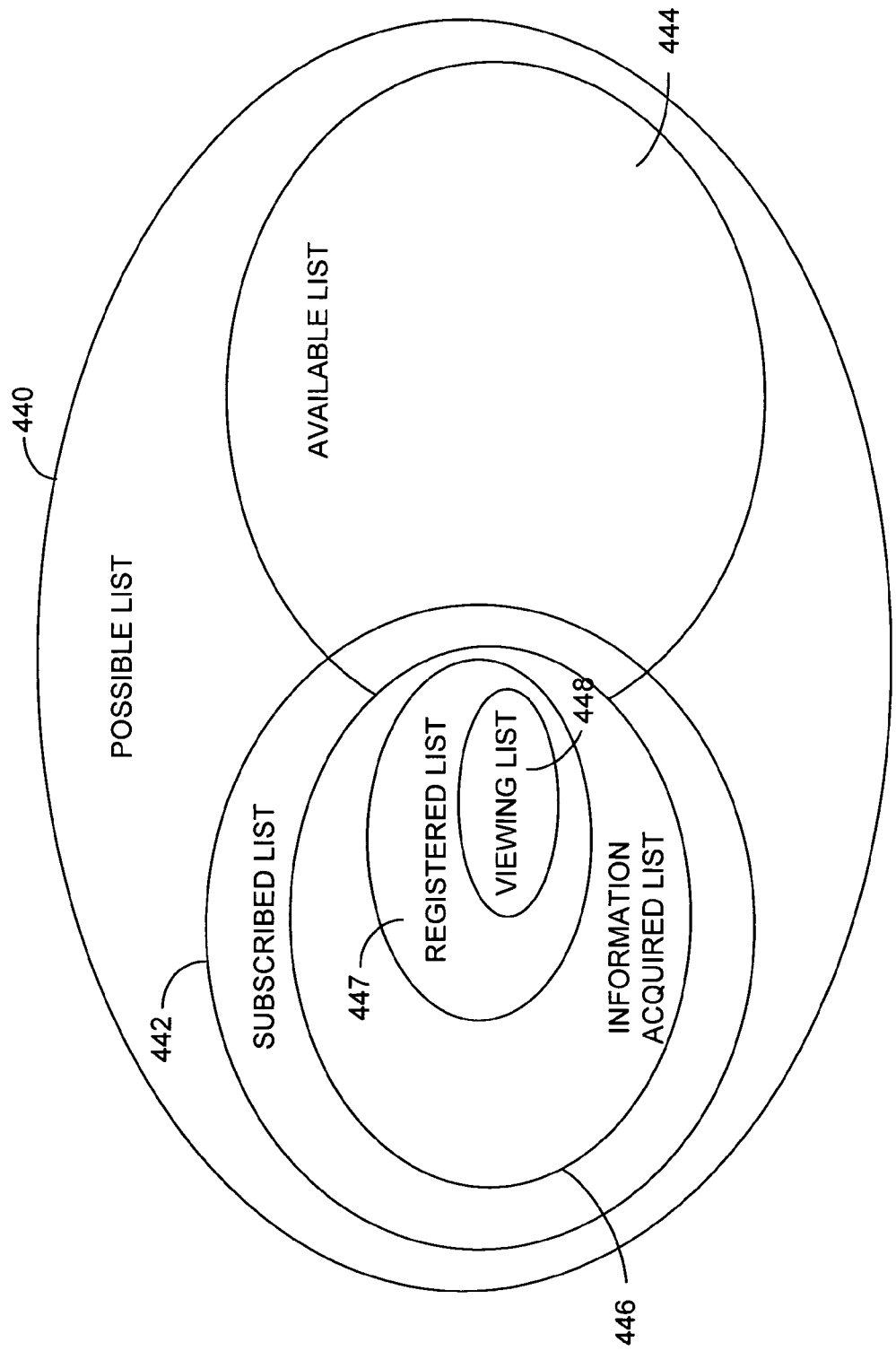
FIG. 8 is a Venn diagram that illustrates the relationship between lists used in a broadcast-multicast system.

FIG. 8 is a Venn diagram that illustrates the relationship between lists used in a broadcast-multicast system. Examples of how the concepts of an allowed RT or RP might be applied to different types of programs such as scheduled programs, on-going programs and unscheduled programs will now be discussed. In the discussion that follows, one skilled in the art will appreciate that although the flow diagrams are drawn in sequential order for comprehension, certain steps can be carried out in parallel in an actual implementation. Furthermore, unless indicate otherwise, steps can be interchanged without departing form the scope of the invention.

Scheduled Programs

Scheduled programs are programs broadcast at predefined times. Operators can schedule broadcast-multicast system (BCMCS) programs in advance such that the program has predefined start and end times. Examples of scheduled programs include movies, news, etc. As discussed with respect to block 10 of FIG. 4 above, mobile users who desire BCMCS service can perform service discovery to discover the BCMCS content name and schedule including the program start time and end time. Service discovery may be performed via out of band mechanisms such as advertisements, SMS, WAP, etc.

face and/or remember the request and send it to the BS once the allowed RT has occurred. Once the allowed RT or program start time arrives, the registration allowed request times are preferably staggered at different times to prevent loading the system. Then the MS forms a Registered List 447. The MS can also form the Viewing List 448 once the user is watching the BCMCS content at block 60 of FIG. 4. Once the program is complete, the MS preferably deletes that program from the Possible List 440 and all subordinate lists so that it prevents the user from requesting a program after the program is finished.

The Table 1 shows an example of the different information that can be stored in the MS.

TABLE 1

| Content Name | Possible List | Subscribed List | Information Acquired List | Available List | Registered List | Viewing List | Start time; End Time | Allowed RT |
|---|---|---|---|---|---|---|---|---|
| CNN news | X | x | x | x | x | x | Jan. 01, 2002; Ongoing | Any |
| HBO Movie 1 | X | x | x | x | x | | Jun. 20, 2003 2:00 PM; 4:00 PM | 1:230 PM |
| HBO Movie 2 | X | | | x | | | | |
| Weather | X | | | x | | | Jun. 01, 2003 Ongoing | Any |
| CNN Stock | X | x | x | | | | Jan. 01, 2002; Ongoing | Any |
| Emergency Program | X | x | x | x | x | x | Jan. 20, 2003 5:00 PM; 5:30 PM/ Ongoing | Not required |

According to this embodiment, scheduled programs can indicate a period of time for registration as an allowed registration period (RP). In one embodiment, this RP can be defined as a period before the start time of such a broadcast.

Upon service discovery, the MS 210 forms a Possible List 440 which contains all BCMCS contents provided by the service provider. The MS shows the Possible List 440 and its schedule to the user via a UI interface. After the user decides to subscribe (at block 20 if FIG. 4) to one or more BCMCS contents via the BCMCS Subscription Manager 238, the MS 210 forms a Subscribed List 442. The Subscribed List can be either the same set or subset of the Possible List 440. Once subscriptions are made, the MS 210 will perform the content information acquisition at block 30 of FIG. 4, to obtain all BCMCS session related information, for example, the BAK if encrypted and header compression scheme. For scheduled programs, the MS can also obtain an allowed RT/RP (for example, X minutes before the program starts.)

When the MS 210 receives overhead messages from the BS 208, that include the Available List 444 for that BS. The BS also indicates in overhead messages whether the MS 210 is allowed to request other BCMCS beyond of the Available List 444. If the user requests a BCMCS which is on the Information Acquired List 446 but is not in the Available List 444, then, when allowed by the BS 208, the MS 210 can send the BCMCS registration to the BS 208. If the user requests any BCMCS which is not in the Information Acquired List 446, the MS 210 can block the request. If the user requests the service before the allowed registered time, the MS 210 can also block the user request and will not send BCMCS registration to the BS 208. In this case, the MS can either indicate the requested BCMCS' schedule including start time, end time, and allowed registered time to the user via User Inter- For scheduled programs, as will be described below, registration may be controlled by either the MS or the network.

FIG. 12 shows an exemplary message flow for a scheduled program in which registration is controlled by the MS. This message flow shows an example of HBO Movie 1 from Table 1. Before the step 1, the MS 210 has obtained the HBO Movie 1's schedule including allowed registration time or period, and other information during BCMCS information acquisition.

At step 1, the BSC 224 sends an overhead message, that indicates that HBO Movie 1 identified by the BCMCS_FLOW_ID(s) is not available at this time. This indication can be provided by the absence of the BCMCS_FLOW_ID(s) in the overhead message.

At step 2, if the user requests the HBO Movie 1 before the allowed registration time or period (1:30 PM), the MS 210 can block the request and may indicate the allowed registered time to the user. After 1:30 PM, the MS 210 sends a BCMCS Registration to the BSC 224 for HBO Movie 1, either autonomously, or upon a repeated request from the user. At step 3, the BSC 208 sends BCMCS registration response to the MS. This may be achieved by L2 Ack. Upon receiving the response from the BS, the MS 210 may tune to the frequency that will contain the HBO Movie 1. Alternatively, the MS 210 could tune to the frequency at step 13. At step 4, since the BSC 224 also has knowledge of BCMCS schedule, before the scheduled time (for example, at 1:59 PM), the BSC/PCF 224 sends the BCMCS Content Request to the PDSN 206 to request A11 connection setup. Alternatively, the BSC/PCF 224 may request setup immediately upon receipt of the first request from any authorized MS 210.

At step 5, the PDSN 206 sends BCMCS Content Request to the BCMCS Controller 212 to request content. At step 6, the BCMCS Controller 212 forwards the Content Request to the content server. At step 7, the content server 202 sends Multicast IP flows to the MR. This step could occur at any time before the start time of the BCMCS program. At step 8, the content server 202 sends the Content Response to the BCMCS Controller. At step 9, the BCMCS Controller 212 sends the Content Response to the PDSN. At step 10, the PDSN 206 sends IGMP to the MR 218 to join the Multicast tree. This step could occur at any time before the start time of the BCMCS program. At step 11, the PDSN 206 sends BCMCS Content Response to the PCF/BSC 24. The A8 and A10 connection is established at this time. At step 12, the Multicast IP flows are sending on that sector. This step could occur at any time before the start time of the BCMCS program. At step 13, the BSC 224 indicates the content is transmitting over the air via the overhead message. The MS 210 tunes to the BCMCS channel.

At step 14, at 4:00 PM, the HBO movie 1 is complete. The BSC 224 is not receiving the BCMCS Content from the PDSN. At step 15, the BSC/PCF 224 sends the BCMCS Bearer Path Release request to the PDSN. At step 16, the PDSN 206 responds with the BCMCS Bearer path Release response. The A8 and A10 connection are released. At step 17, the BSC 208 indicates to the MS 210 via the overhead message that the HBO Movie 1 stops transmitting. This could be in the form of the overhead message containing no information about the program. Alternatively, it could be in the form of the overhead message containing the program identification and an indicator that the program is not available. Such an indication could be transmitted for some grace period following the program end time, after which the overhead message would contain no information about the program.

Network Controlled Method

Figure 10:
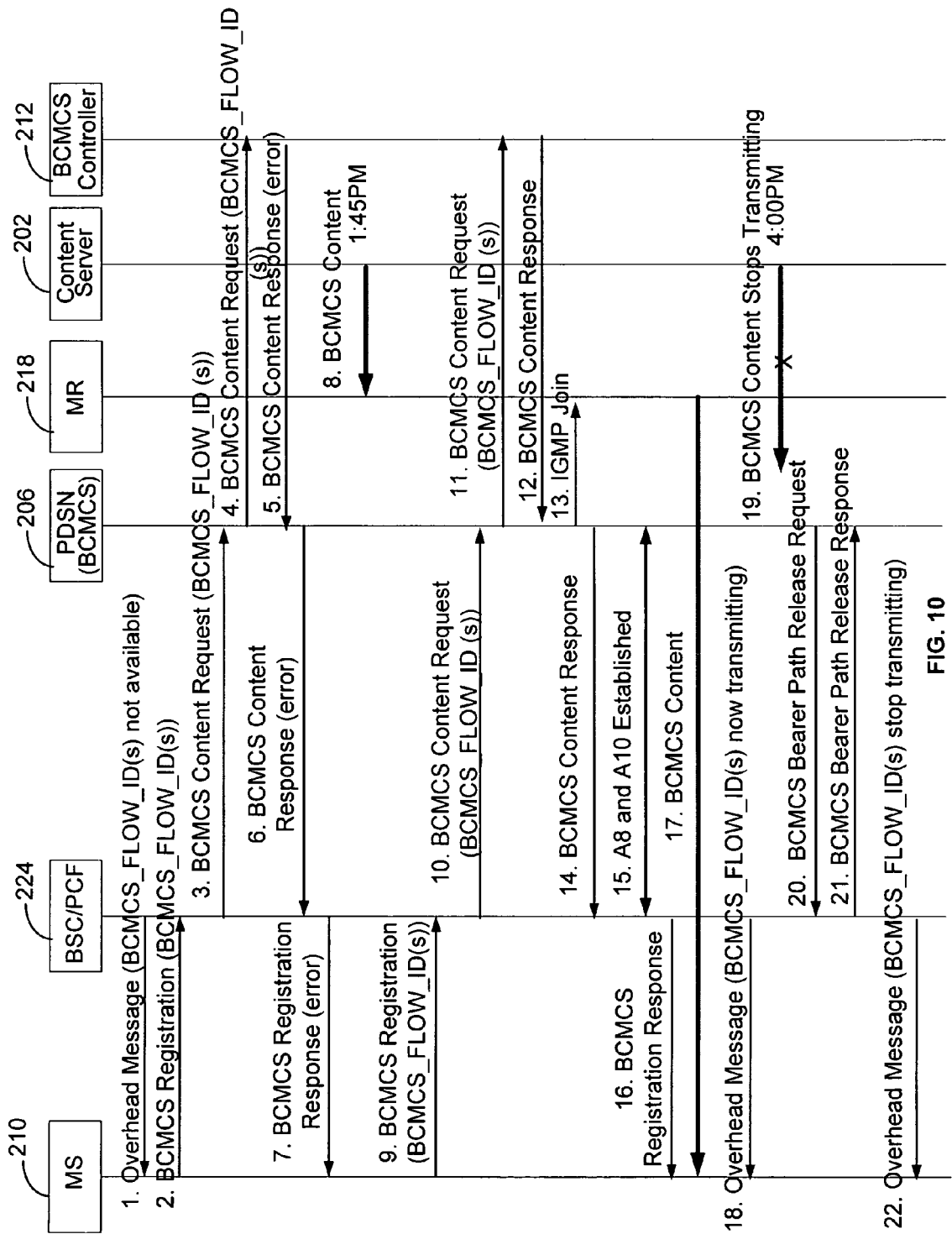
FIG. 10 shows an exemplary message flow for a scheduled program in which registration is controlled by the network.

FIG. 10 shows an exemplary message flow for a scheduled program in which registration is controlled by the network. The scheduled program in this example is HBO Movie 1 from Table 1. This method does not require the MS 210 to filter out any request from the user. The method relies on the network to indicate whether or not the MS 210 is allowed to register for the scheduled BCMCS program.

At step 1, the BSC 224 sends an overhead message, which indicates that HBO Movie 1, identified by the BCMCS_FLOW_ID(s), is not available at this time. This indication is provided by the absence of the BCMCS_FLOW_ID(s) from the overhead message.

At step 2, if the user requests the HBO Movie 1 at any time, the MS 210 sends a BCMCS registration request for specific BCMCS_FLOW_ID(s) to the BSC 224. At step 3, the BSC/PCF 224 forwards the BCMCS content request to the PDSN 206. The BCMCS content request specifies BCMCS_FLOW_ID(S). At step 4, the PDSN 206 forwards the BCMCS content request to the BCMCS Controller 212. At step 5, the BCMCS Controller 212 has the knowledge of BCMCS schedule. Because it is too early for the MS 210 to register this service, the Controller 212 will send the BCMCS content response with error code included. The error code may include information about when the MS 210 is allowed to register for this service. At step 6, the PDSN 206 sends the BCMCS content response to the BSC/PCF 224 with error code included. At step 7, the BSC/PCF 208 sends the BCMCS registration response to the MS 210 with error code included.

At step 8, some time before the program starts (for example, 1:45 PM), the content server 202 will initiate content setup with MR 218. At this point, some content can be sent out, such as music or advertisement, etc.

At step 9, sometime later, if the user requests the HBO Movie 1, the MS 210 will send a BCMCS Registration to the BSC. Alternatively, if the MS 210 was made aware of the allowed RT, the MS 210 may autonomously send the request to the BSC 224. At step 10, the BSC/PCF 208 forwards the BCMCS content request to the PDSN 206. The BCMCS content request specifies BCMCS_FLOW_IDS(s). At step 11, The PDSN 206 forwards the BCMCS content request to the BCMCS Controller 212.

At step 12, the BCMCS Controller 212 has the knowledge of BCMCS schedule. Because the allowed registered time has started, the controller will send the BCMCS content response to the PDSN 206. At step 13, the PDSN 206 joins Multicast tree via IGMP if this is the first user. This step could occur at any time before the start time of the BCMCS program. At step 14, the PDSN 206 sends the BCMCS content response to the BSC/PCF. At step 15, A8 and A10 connections are established. At step 16, the BSC/PCF sends the BCMCS registration response to the MS to confirm the service has registered successfully. Upon receiving the response from the BS, the MS is tuned to the frequency that will contain the HBO Movie 1. At step 17, the Multicast IP flows are sending on that sector. This step could occur at any time before the start time of the BCMCS program. At step 18, the BSC 224 indicates the content is transmitting over the air via the overhead message. The MS tunes to the BCMCS channel.

At step 19, at 4:00 PM, the HBO movie 1 is complete. The content server 202 stops transmitting the HBO Movie 1. At step 20, the PDSN 206 requests the BSC/PCF 208 to tear down the A10 connection via the BCMCS bearer path release request message. At step 21, the BSC/PCF 208 responds with the BCMCS bearer path release response to the PDSN 206. At step 22, the BSC indicates to the MS, via the overhead message, that the HBO Movie 1 stops transmitting. For example, the overhead message may contain no information about the program. Alternatively, the overhead message containing the program identification could indicate an indicator that the program is not available. Such an indication could be transmitted for some grace period following the program end time, after which the overhead message would contain no information about the program.

On-Going Programs

On-going content programs are programs that start at some time and are broadcast without a scheduled end time. Examples of on-going content programs can include news information, weather information, music or stock information that is broadcasted on an on-going basis. Table 1 provides an example of a program for the content named "CNN News." According to this embodiment, after the user decides to receive an on-going content program, the user finds an allowed registration time (RT) or registration period (RP) associated with that program. For BCMCS ongoing programs, the MS can be notified of a program start time and allowed registration time (RT) or registration period (RP).

Service discovery and subscription are performed similarly to the manner that scheduled programs are preformed. During information acquisition, the MS will be notified of a start time, which could be in the past, and an end time that can be set to indicate that the program is ongoing. Alternatively, the end time can be set far in the future. An allowed RT/RP can be set to indicate that any time is permissible. Registration for ongoing programs is performed similarly to how registration is performed for scheduled programs. Bearer path setup and teardown, frequency tuning and overhead information are also performed in similar manners as for scheduled programs.

Alternatively, the ongoing program can be split into multiple, contiguous blocks of time. For example, an ongoing music program could be broken into blocks of 2 hours, running back-back. This changes the nature of the program from an ongoing program to a scheduled program, and all the steps can be performed as described above with reference to scheduled programs. However, it is desirable that bearer path setup and teardown be associated with the ongoing program, not the individual blocks. This can be achieved by associating the bearer with the BCMCS_FLOW_ID(s), and by reusing them from one block to another. The BSC/PCF 224 and PDSN 206 can make decisions regarding bearer path lifetimes based on the lifetimes of the BCMCS_FLOW_ID(s). This alternative provides the user with information in the form of blocks, but the network treats the ongoing program as such.

BCMCS Unscheduled Programs

For certain "unscheduled" programs, the operator may not be able to schedule them in advance. Emergency programs, for instance, are normally broadcast without any set schedule. The content associated with emergency programs might include, for example, information about an impending tornado, severe road hazards, etc.

The network can notify the MS 210 of the unscheduled program via several different ways, for example, via broadcast Short Message Services (SMS), or an overhead message. In one embodiment, an originating station, such as a base station, notifies a destination station, such as a mobile station, that such an emergency broadcast will take place via SMS. This notification may also contain the program start time and an allowed RT/RP for receiving the broadcast.

Figure 9:
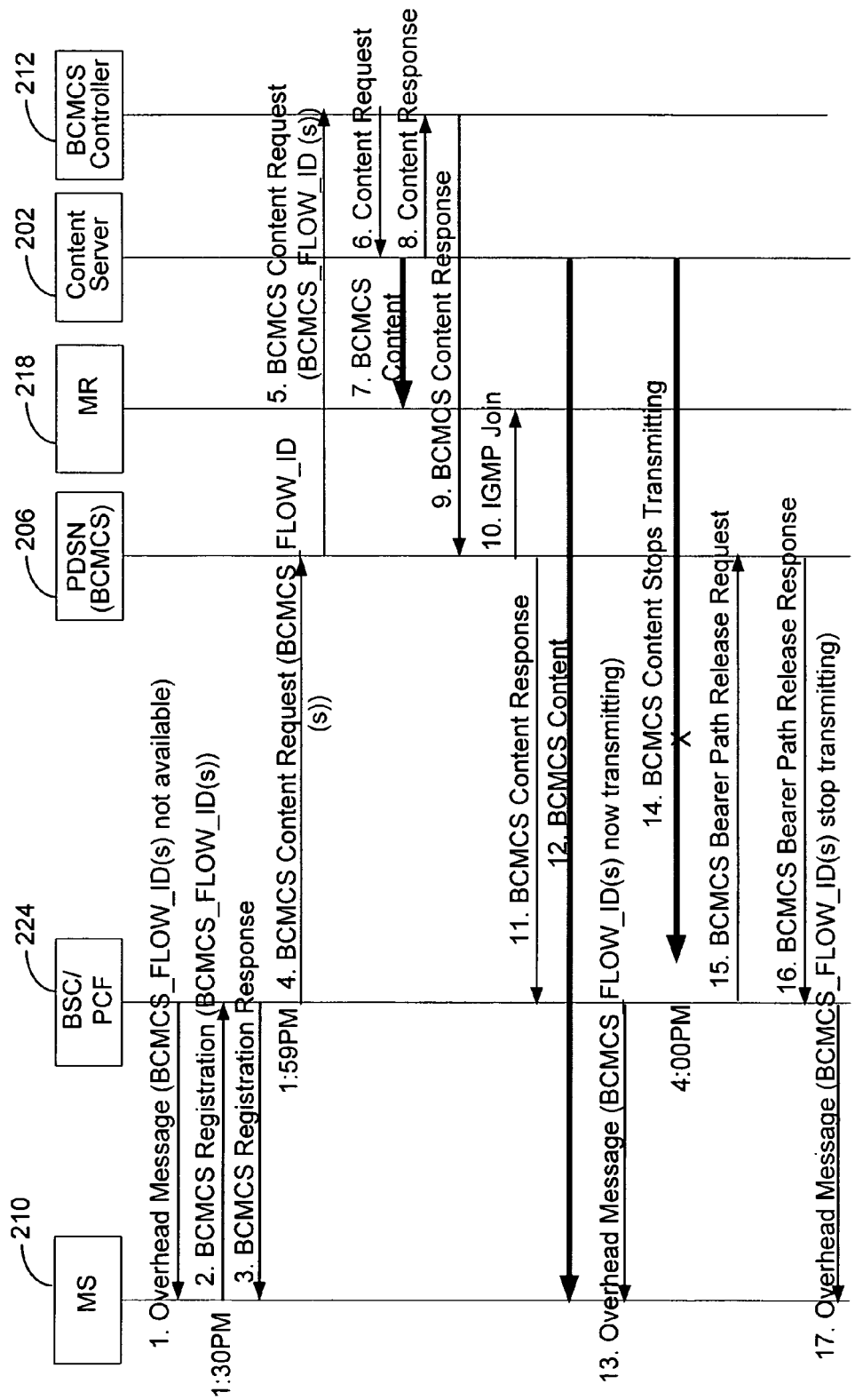
FIG. 9 shows an exemplary message flow for a scheduled program in which registration is controlled by the destination station.
Figure 11:
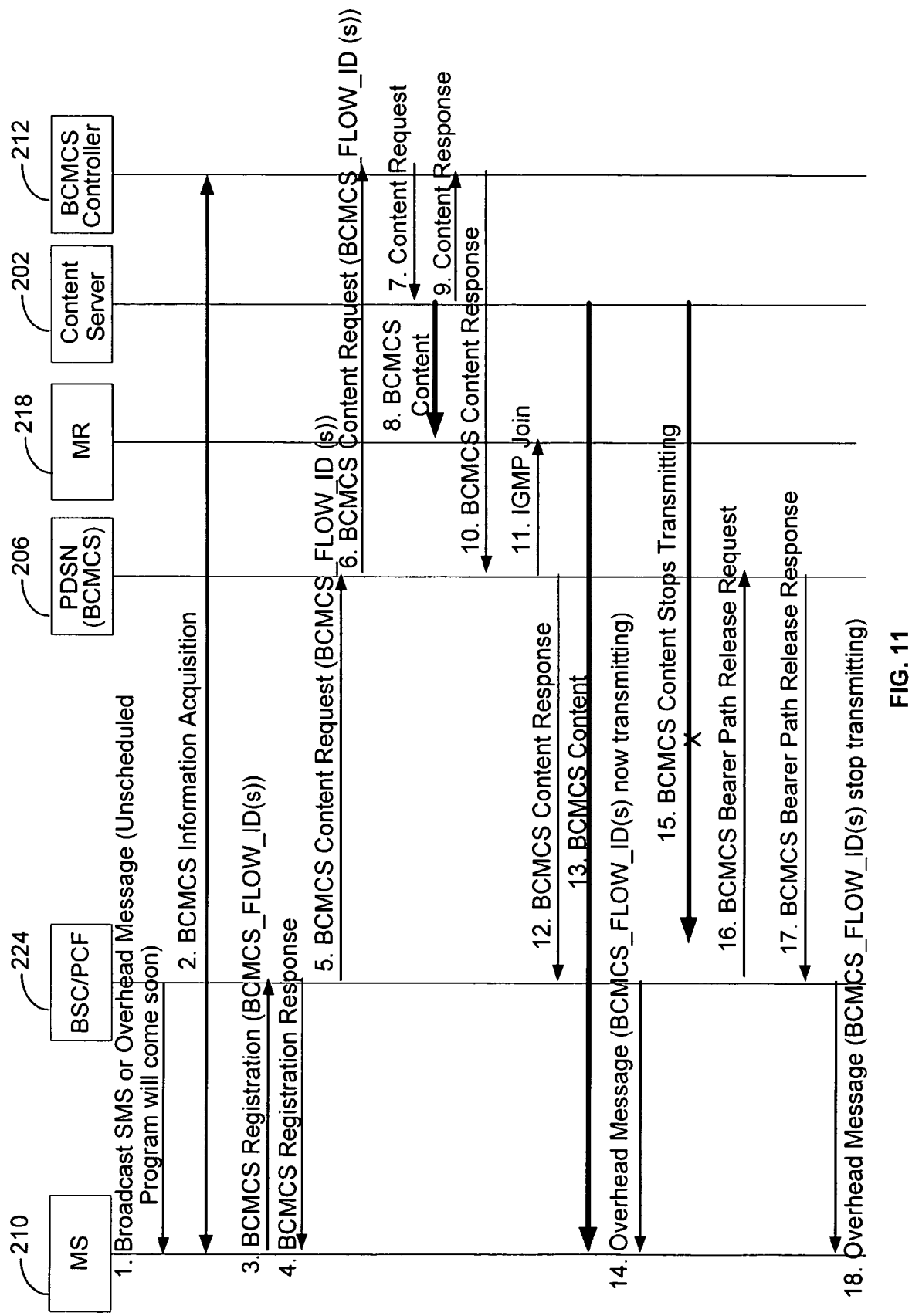
FIG. 11 shows an exemplary message flow for an unscheduled program.

FIG. 11 shows an exemplary message flow for an unscheduled, emergency program. Many steps in FIG. 11 are described above with reference to FIG. 9, and therefore will not be repeated for purposes of simplicity. Upon receiving the notification from the network, at step 2, the MS 210 performs the BCMCS information acquisition with the BCMCS Controller 212. The MS 210 obtains the program start time and allowed RT/RP. The MS 210 can then add the program start time and allowed RT/RP into Possible List and Subscribed List, and indicate them to the users via UI. For such programs, the subscriptions and registrations may not be needed in some embodiments. Other steps are similar to those discussed above with reference to scheduled and ongoing programs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, steps of flow diagrams, and the functionality of the destination stations and origination stations, described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of flow diagrams and the functionality of the destination stations and origination stations described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. An apparatus, comprising:
means for receiving a first registration period parameter from at least one origination station, wherein the first registration period parameter specifies a first period during which a first destination station is allowed to register with the origination station in order to correctly receive a broadcast session; and
means for blocking any attempted registration request that occurs outside the first period.

2. The apparatus of claim 1, further comprising:
means for requesting registration until a registration request is sent within the first period, if the registration request from the apparatus is sent before the first period begins.

3. The apparatus of claim 2, wherein the first registration period parameter is communicated to the first destination station at a first time, and wherein a second registration period parameter is communicated to other destination stations at a second time.

4. The apparatus of claim 3, wherein the first time is different than the second time.

5. The apparatus of claim 3, wherein the first time is approximately the same as the second time.

6. The apparatus of claim 2, wherein the first registration period parameter comprises an allowed registration period associated with the broadcast session during which the destination station is allowed to send a registration attempt message to the origination station.

7. The apparatus of claim 6, wherein the allowed registration period associated with the broadcast session indicates an allowed registration period before the start of a broadcast program.

8. The apparatus of claim 7, wherein the broadcast program comprises at least one source of content.

9. The apparatus of claim 8, wherein the broadcast program comprises an emergency program.

10. The apparatus of claim 8, wherein the broadcast program comprises an on-going content program.

11. The apparatus of claim 8, wherein the program comprises a scheduled program, and wherein the first registration period parameter further comprises a schedule that includes a program start time parameter.

12. A wireless communicator, comprising:
a receiver that receives a first registration period parameter from at least one origination station, wherein the first registration period parameter specifies a first period during which a first destination station is allowed to register with the origination station in order to correctly receive a broadcast session;
an input device for inputting a request to register for a broadcast session; and
a controller including a blocking unit that blocks any attempted registration request that occurs outside the first period.

13. The wireless communicator of claim 12, wherein the controller further comprises:
a registration request repeat unit that repeatedly requests registration until a registration request is sent within the first period.

14. The wireless communicator of claim 13, wherein the first registration period parameter is communicated to the first destination station at a first time, and wherein a second registration period parameter is communicated to other destination stations at a second time.

15. The wireless communicator of claim 14, wherein the first time is different than the second time.

16. The wireless communicator of claim 14, wherein the first time is approximately the same as the second time.

17. The wireless communicator of claim 12, wherein the first registration period parameter comprises an allowed registration period associated with the broadcast session during which the first destination station is allowed to send a registration attempt message to the at least one origination station.

18. The wireless communicator of claim 17, wherein the allowed registration period associated with the broadcast session indicates an allowed registration period before a start of a broadcast program.

19. The wireless communicator of claim 17, wherein the broadcast program comprises at least one source of content.

20. The wireless communicator of claim 19, wherein the broadcast program comprises an emergency program.

21. The wireless communicator of claim 19, wherein the broadcast program comprises an on-going content program.

22. The wireless communicator of claim 19, wherein the program comprises a scheduled program, and wherein the first registration period parameter further comprises a schedule that includes a program start time parameter.

23. A method, comprising:
receiving a first registration period parameter from at least one origination station, wherein the first registration period parameter specifies a first period during which a first destination station is allowed to register with the origination station in order to correctly receive a broadcast session; and
blocking any attempted registration request that occurs outside the first period.

24. The method of claim 23, further comprising:
requesting registration until a registration request is sent within the first period, if the registration request from the apparatus is sent before the first period begins.

25. The method of claim 24, wherein the first registration period parameter is communicated to the first destination station at a first time, and wherein a second registration period parameter is communicated to other destination stations at a second time.

26. The method of claim 25, wherein the first time is different than the second time.

27. The method of claim 25, wherein the first time is approximately the same as the second time.

28. The method of claim 24, wherein the registration period parameter comprises an allowed registration period associated with the broadcast session during which the destination station is allowed to send a registration attempt message to the origination station.

29. The method of claim 28, wherein the allowed registration period associated with the broadcast session indicates an allowed registration period before the start of a broadcast program.

30. A computer-readable storage media including instructions encoded thereon that when executed cause an apparatus to perform a method comprising:
receiving a first registration period parameter from at least one origination station, wherein the first registration period parameter specifies a first period during which a first destination station is allowed to register with the origination station in order to correctly receive a broadcast session; and
blocking any attempted registration request that occurs outside the first period.

31. The computer-readable storage media of claim 30, wherein the method further comprises:
requesting registration until a registration request is sent within the first period, if the registration request from the apparatus is sent before the first period begins.

32. An apparatus, comprising:
a receiver that receives a first registration period parameter from at least one origination station, wherein the first registration period parameter specifies a first period during which a first destination station is allowed to register with the origination station in order to correctly receive a broadcast session; and
a controller including a blocking unit that blocks any attempted registration request that occurs outside the first period.

33. The apparatus of claim 32, wherein the controller further comprises:
a registration request repeat unit that repeatedly requests registration until a registration request is sent within the first period.

34. An apparatus, comprising:
a transmitter that transmits a first registration period parameter to at least one destination station, wherein the first registration period parameter specifies a first period during which the first destination station is allowed to register with an origination station in order to correctly receive a broadcast session; and a controller including a denying unit that denies any attempted registration request that occurs outside the first period.

35. The apparatus of claim 34, wherein the first registration period parameter is communicated to the first destination station at a first time, and wherein the transmitter is further configured to transmit a second registration period parameter to other destination stations at a second time.

36. A method, comprising:

transmitting a first registration period parameter to at least one destination station, wherein the first registration period parameter specifies a first period during which the first destination station is allowed to register with an origination station in order to correctly receive a broadcast session; and denying any attempted registration request that occurs outside the first period.

37. The apparatus of claim 36, wherein the transmitting a first registration period parameter comprises transmitting the first registration period parameter to the first destination station at a first time, and wherein the method further comprises transmitting a second registration period parameter to other destination stations at a second time.

* * * * *